US008444063B2

(12) United States Patent
Lichte et al.

(10) Patent No.: US 8,444,063 B2
(45) Date of Patent: May 21, 2013

(54) SPRINKLER ASSEMBLY

(75) Inventors: Leo James Lichte, Riverside, CA (US);
James Zimmerman, Walnut, CA (US);
Jeff McKenzie, Lake Arrowhead, CA
(US); James T. Wright, III, Moreno
Valley, CA (US); Peter Janku,
Temecula, AR (US)

(73) Assignee: The Toro Company, Bloomfield, MN (US)

( * ) Notice: Subject to any disclaimer, the term of this patent is extended or adjusted under 35 U.S.C. 154(b) by 0 days.

(21) Appl. No.: 12/608,915

(22) Filed: Oct. 29, 2009

(65) Prior Publication Data
US 2010/0044465 A1    Feb. 25, 2010

Related U.S. Application Data

(63) Continuation of application No. 11/303,328, filed on Dec. 15, 2005, now Pat. No. 7,631,813.

(60) Provisional application No. 60/637,342, filed on Dec. 17, 2004.

(51) Int. Cl.
*B05B 15/10* (2006.01)
*B05B 1/00* (2006.01)

(52) U.S. Cl.
USPC .............................. 239/203; 239/204; 239/600

(58) Field of Classification Search
USPC ............... 239/200–206, 600, DIG. 1, 237, 239/240–242
See application file for complete search history.

(56) References Cited

U.S. PATENT DOCUMENTS

| | | | |
|---|---|---|---|
| 3,107,056 A * | 10/1963 | Hunter | 239/206 |
| 3,782,638 A * | 1/1974 | Bumpstead | 239/242 |
| 4,448,353 A * | 5/1984 | Livne | 239/205 |
| 5,899,386 A | 5/1999 | Miyasato et al. | |
| 6,042,021 A | 3/2000 | Clark | |
| 6,050,502 A | 4/2000 | Clark | |
| 6,199,587 B1 | 3/2001 | Shlomi et al. | |
| 6,227,455 B1 | 5/2001 | Scott et al. | |
| 6,336,596 B1 | 1/2002 | Katzman et al. | |
| 6,402,048 B1 | 6/2002 | Collins | |
| 6,491,235 B1 | 12/2002 | Scott et al. | |
| 6,600,971 B1 | 7/2003 | Smith et al. | |
| 6,799,732 B2 | 10/2004 | Sirkin | |
| 6,802,458 B2 | 10/2004 | Gregory | |
| 6,808,127 B2 | 10/2004 | McNulty et al. | |
| 6,812,826 B2 | 11/2004 | Buhler et al. | |
| 6,820,825 B1 | 11/2004 | Wang | |
| 6,827,291 B2 | 12/2004 | Townsend | |
| 2002/0092924 A1* | 7/2002 | Ingham et al. | 239/205 |
| 2004/0089735 A1 | 5/2004 | Drechsel | |
| 2006/0091236 A1* | 5/2006 | Helzer et al. | 239/205 |

\* cited by examiner

*Primary Examiner* — Darren W Gorman
(74) *Attorney, Agent, or Firm* — Inskeep IP Group, Inc.

(57) ABSTRACT

The present invention includes an improved sprinkler design having a magnetic sensing system for determining the position of the riser nozzle, a waterproofed motor housing and related cables, configurable sprinkler body compartments, and a pilot valve with a check valve assembly, both of which are located within the sprinkler body.

23 Claims, 16 Drawing Sheets

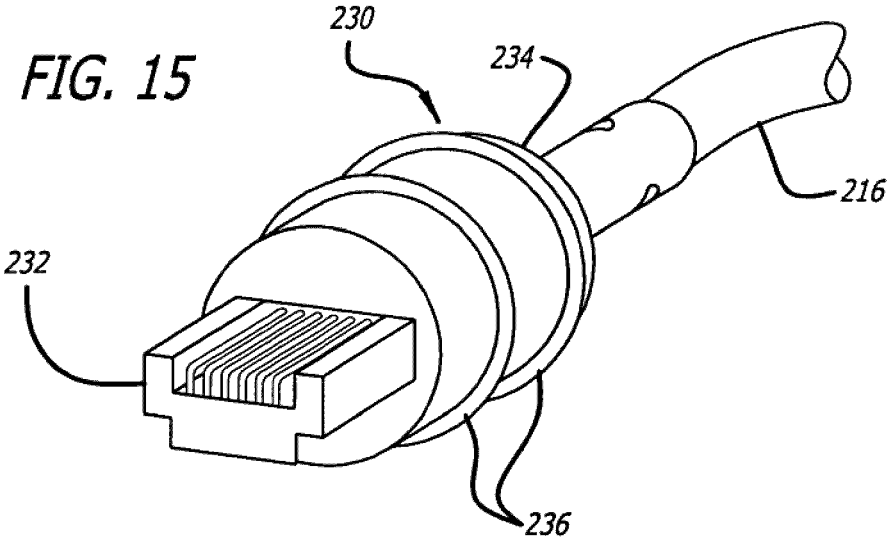
FIG. 15
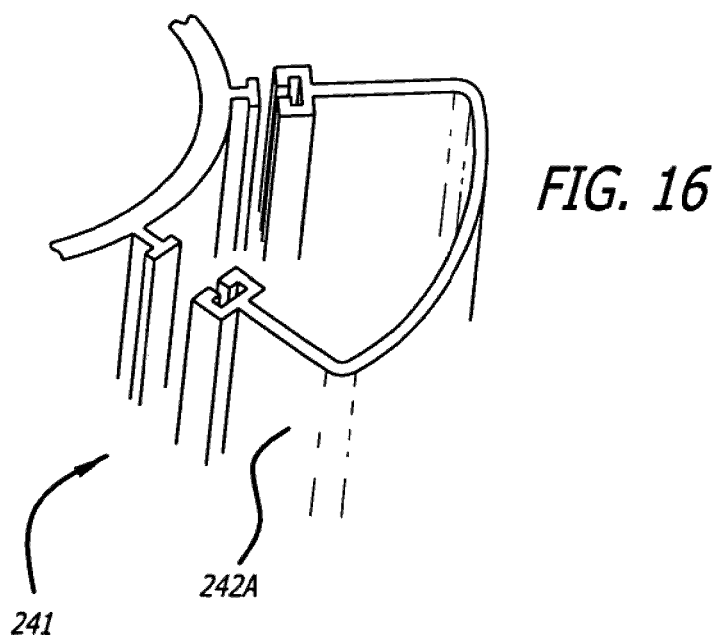
FIG. 16
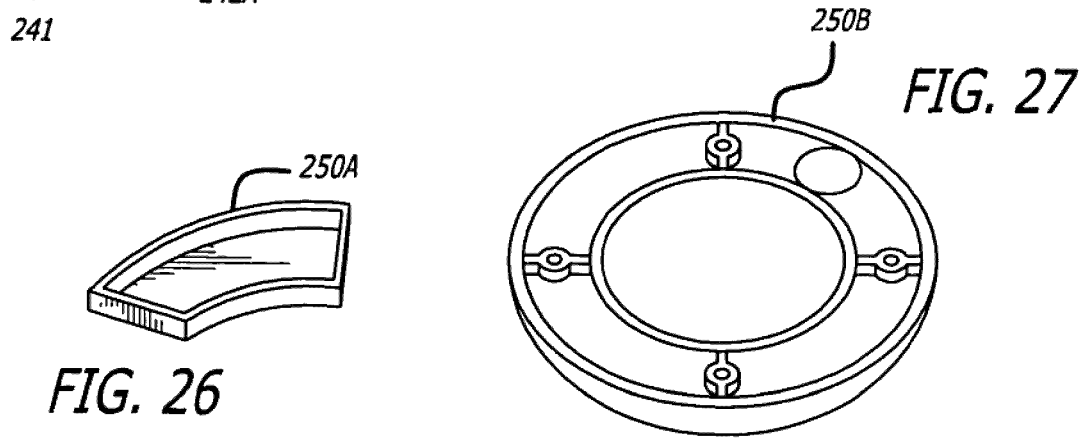
FIG. 26
FIG. 27

SPRINKLER ASSEMBLY

RELATED APPLICATIONS

This application claims priority to U.S. patent application Ser. No. 11/303,328 filed Dec. 15, 2005 entitled Sprinkler Assembly, and to U.S. Provisional Application Ser. No. 60/637,342 filed Dec. 17, 2004 entitled Sprinkler Assembly, and b both of which are hereby incorporated by reference herein in their entireties.

FIELD OF THE INVENTION

This invention relates generally to irrigation sprinklers. More specifically, this invention relates to a motorized irrigation sprinkler having an improved body compartment design with magnetic sprinkler head sensing.

BACKGROUND OF THE INVENTION

Sprinkler systems for turf irrigation are well known. Typical systems include a plurality of valves and sprinkler heads in fluid communication with a water source, and a centralized controller connected to the water valves. At appropriate times the controller opens the normally closed valves to allow water to flow from the water source to the sprinkler heads. Water then issues from the sprinkler heads in predetermined fashion.

There are many different types of sprinkler heads, including above-the-ground heads and "pop-up" heads. Pop-up sprinklers, though generally more complicated and expensive than other types of sprinklers, are thought to be superior. There are several reasons for this. For example, a pop-up sprinkler's nozzle opening is typically covered when the sprinkler is not in use and is therefore less likely to be partially or completely plugged by debris or insects. Also, when not being used, a pop-up sprinkler is entirely below the surface and out of the way.

The typical pop-up sprinkler head includes a stationary body and a "riser" which extends vertically upward, or "pops up," when water is allowed to flow to the sprinkler. The riser is in the nature of a hollow tube which supports a nozzle at its upper end. When the normally-closed valve associated with a sprinkler opens to allow water to flow to the sprinkler, two things happen: (i) water pressure pushes against the riser to move it from its retracted to its fully extended position, and (ii) water flows axially upward through the riser, and the nozzle receives the axial flow from the riser and turns it radially to create a radial stream. A spring or other type of resilient element is interposed between the body and the riser to continuously urge the riser toward its retracted, subsurface, position, so that when water pressure is removed the riser assembly will immediately return to its retracted position.

The riser assembly of a pop-up or above-the-ground sprinkler head can remain rotationally stationary or can include a portion that rotates in continuous or oscillatory fashion to water a circular or partly circular area, respectively. More specifically, the riser of the typical rotary sprinkler includes a first portion (e.g. the riser), which does not rotate, and a second portion, (e.g. the nozzle assembly) which rotates relative to the first (non-rotating) portion.

The rotating portion of a rotary sprinkler riser typically carries a nozzle at its uppermost end. The nozzle throws at least one water stream outwardly to one side of the nozzle assembly. As the nozzle assembly rotates, the water stream travels or sweeps over the ground.

The non-rotating portion of a rotary sprinkler riser assembly typically includes a drive mechanism for rotating the nozzle. The drive mechanism generally includes a turbine and a transmission. The turbine is usually made with a series of angular vanes on a central rotating shaft that is actuated by a flow of fluid subject to pressure. The transmission consists of a reduction gear train that converts rotation of the turbine to rotation of the nozzle assembly at a speed slower than the speed of rotation of the turbine.

During use, as the initial inrush and pressurization of water enters the riser, it strikes against the vanes of the turbine causing rotation of the turbine and, in particular, the turbine shaft. Rotation of the turbine shaft, which extends into the drive housing, drives the reduction gear train that causes rotation of an output shaft located at the other end of the drive housing. Because the output shaft is attached to the nozzle assembly, the nozzle assembly is thereby rotated, but at a reduced speed that is determined by the amount of the reduction provided by the reduction gear train.

Alternatively, the drive mechanism may include a stepper motor coupled to the transmission in place of the turbine. Unlike the turbine, a stepper motor provides a constant rotational drive source which is easily electrically controlled. However, such a stepper motor is located within the sprinkler body, and typically is positioned within the water flow path in the riser. Consequently, the motor housing and the related wires protruding from the housing must be waterproofed to prevent water related motor malfunction.

Further, sprinklers (including a motorized sprinkler) typically rely on mechanical watering arc adjustments located on the sprinkler to control which areas a sprinkler head rotates through when watering. Consequently, a user must mechanically set each arc adjustment at each sprinkler location. Since an irrigation system may have many sprinklers, determining and setting individual sprinkler arcs at each sprinkler site can consume a large amount of time, especially if the irrigation system is installed over a large area such as a golf course.

Another feature of many prior art sprinklers is the use of electrically actuated pilot valves which connect inline with the irrigation water supply and a sprinkler, allowing the water flow to an individual sprinkler to be turned on or off, preferably from a distant central control system. Typically, these pilot valves are located partially or even completely outside the sprinkler body. Thus, when the pilot valve needs adjustment or replacement, a user must shut off the water supply leading to the pilot valve, dig around the sprinkler to find the pilot valve, replace the pilot valve, rebury it, then turn the water supply back on. Since the main water supply must be shut off, other sprinklers will not function during this time consuming repair and may interrupt preprogrammed watering cycles.

Although the prior art sprinklers discussed above have been known to operate with general satisfaction, there is always a need to pursue improvements. For example, prior art sprinklers do not always provide the desired accuracy in rotating the nozzle. Nor do they typically offer easy ways to maintain or repair the sprinkler. Nor do they offer the user a way to remotely control or remotely reconfigure the sprinkler. In these and other respects, therefore, the prior art sprinklers are known to have substantive limitations.

What is needed is a motorized sprinkler that senses the position of the riser nozzle, allowing the watering arc to be modified at a distant location. What is also needed is a sprinkler having a waterproof motor housing to prevent water related damage to the sprinkler motor. Further, what is needed is a sprinkler that incorporates external sprinkler components, such as a pilot valve, within the sprinkler body for easy access during repair and replacement.

OBJECTS AND SUMMARY OF THE INVENTION

It is an object of the present invention to overcome the above stated limitations of the prior art.

It is a further object of the present invention to provide a motorized sprinkler with a waterproof motor housing.

It is yet a further object of the present invention to provide a motorized sprinkler system wherein the vertical position of the riser and the arc position of the nozzle can be sensed remotely.

It is yet a further object of the present invention to provide a motorized sprinkler that allows its watering arc to be modified at a distant location.

It is a further object of the present invention to provide an improved sprinkler body design, including integrally molded sprinkler body compartments.

It is an object of the present invention to provide an easily removable pilot valve that is located internal to the sprinkler body compartment.

The above stated objects are achieved with the present invention which includes an improved sprinkler design including a magnetic sensing system for determining the elevation and angular position of the nozzle, a waterproofed motor housing and related cables, configurable sprinkler body compartments, and a pilot valve with a check valve assembly, both of which are located within the sprinkler body compartment.

BRIEF DESCRIPTION OF THE DRAWINGS

FIG. 15 illustrates a perspective view of a waterproof motor communication connector according to the present invention;

FIG. 16 illustrates a perspective view of an alternate preferred embodiment of a single attachable body compartment according to the present invention;

FIG. 26 illustrates a perspective view of a single compartment floor for a sprinkler according to the present invention; and FIG. 27 illustrates a perspective view of a unitary sprinkler compartment floor according to the present invention.

DETAILED DESCRIPTION OF THE INVENTION

The present invention provides an improved sprinkler having a motorized riser with magnetic position sensing and a waterproof motor housing. These features allow the sprinkler to send riser position data to a central computer control system and, in turn, to accept control signals back from the computer control system determining the desired watering arc for that sprinkler.

The present invention also provides a sprinkler body with additional body compartments adjacent the sprinkler body wall. These compartments may be configurable in size and shape to accept a variety of different sprinkler related equipment which have traditionally not been included within the sprinkler body. Also, each compartment may be easily accessible by opening a top lid on the sprinkler body.

Finally, the present invention includes a pilot valve configured within a sprinkler body compartment, also including an inline check valve. Since the pilot valve is located within a body compartment, the pilot valve is easily accessible for maintenance. Ease of repair is further increased by a check valve that allows the pilot valve to be removed from the sprinkler without first shutting down the main water supply.

Irrigation Sprinkler with Position Sensing

Figure 1A:
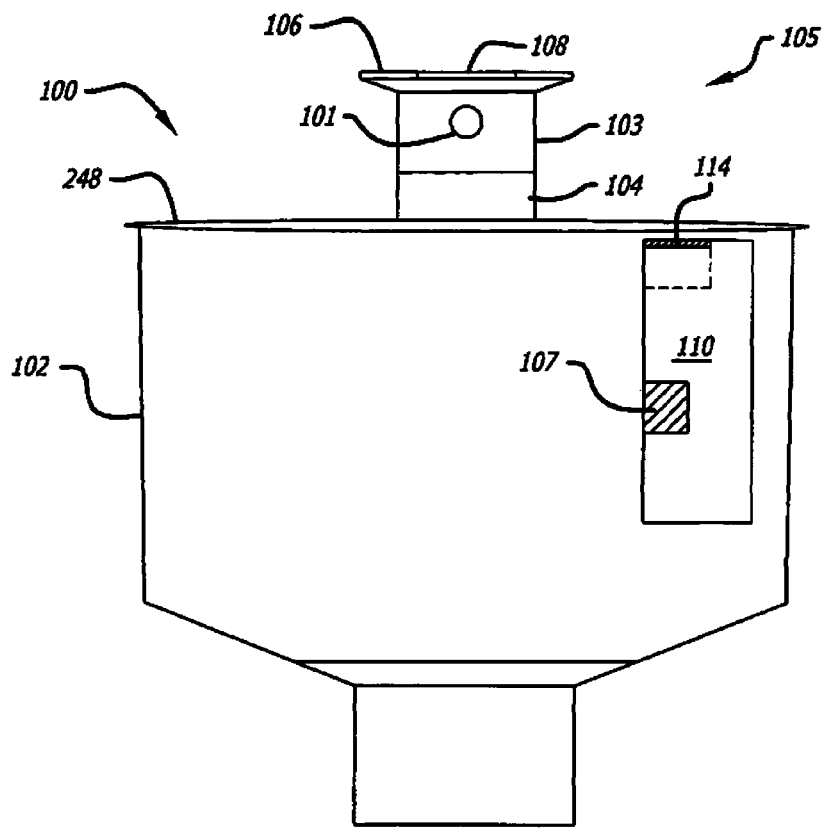
FIG. 1A illustrates a side view of a sprinkler according to the present invention.
Figure 1B:
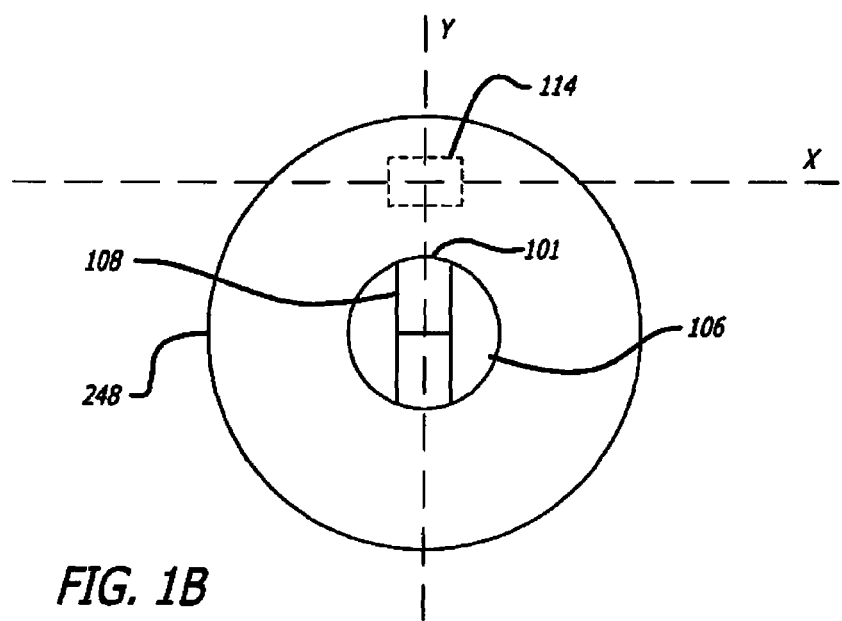
FIG. 1B illustrates a top view of the sprinkler of FIG. 1A.

Referring to FIGS. 1A and 1B, a sprinkler 100 is shown according to the present invention, having a magnet 108 positioned in the sprinkler nozzle assembly 103 of the riser assembly 105 and a magnet sensor 114 located in an electronic assembly 110 of the sprinkler body 102. Note that the riser assembly 105 includes riser 104 and nozzle assembly 103. Generally, the magnet sensor 114 senses the strength of the magnetic field as the magnet 108 moves towards and away (both rotationally and linearly up and down) from the magnetic sensor 114, allowing a microprocessor 107 within the irrigation sprinkler 100 to detect the rotational position, speed of rotation, direction of the nozzle rotation, and longitudinal position of the riser 104.

The magnet 108 is positioned at the upper-most portion of the riser 106, preferably extending substantially the entire diameter across the riser 106. Thus, the magnet 108 rotates with the sprinkler riser 106, varying the magnetic fields immediately around the riser 106. A known pole of the magnet, for example North, is positioned inline with, and oriented towards the nozzle 101 of the nozzle assembly 103, associating a known magnetic field value with the nozzle 101 for reference in determining the rotational angle of the nozzle 101 during operation.

The magnet 108 is preferably a dipole magnet, having predominant North and South poles. A Ceramic 8 material magnet is preferred; however a magnet with similar properties may also be used.

The magnet sensor 114 is located near the top of an electronic assembly 110 of the sprinkler body 102, but may also preferably be located within an upper, sealed region of the sprinkler body itself. Preferably, a two axis magneto-restrictive sensor such as a HMC1052 model manufactured by Honeywell is used for the magnet sensor 114, although a wide range of similar sensors may be used, so long as they have the necessary sensitivity to detect the magnetic field fluctuation.

The magnet sensor 114 is connected to a microprocessor 107 located in the electronic assembly of sprinkler body 102 or alternatively in a remote location, which accepts magnetic field data sensed by the magnet sensor 114. The microprocessor 107 then calculates the position of the nozzle 101 of the nozzle assembly 103 (e.g. angular position and "popped up" or retracted position) so that this position data may be relayed to a central controller.

The sprinkler 100 preferably has an electric stepper motor (described in further detail below) which rotates the nozzle assembly 103, allowing a desired area around the sprinkler to be watered. However, other methods of rotating the nozzle assembly 103 may be used, such as traditional turbine driven mechanisms with an electrically controlled rotation-reversing switch.

Figure 2:
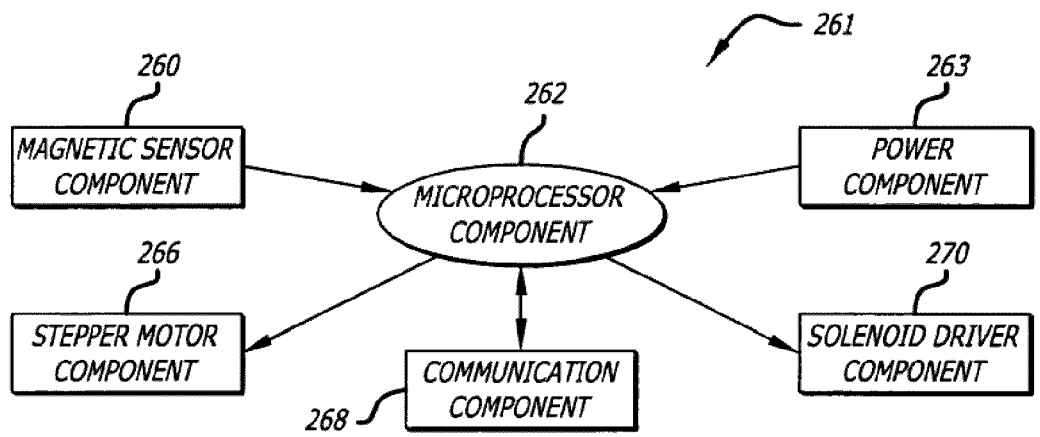
FIG. 2 illustrates a flow chart of a magnetic sensing sprinkler according to the present invention.

As seen in the flow chart of FIG. 2, the position sensing processes 261 according to one embodiment of the present invention generally comprises a microprocessor component 262 (i.e. the microprocessor 107) which accepts electrical power from a power component 263, command signals from a communication component 268 and magnetic sensing data from a magnetic sensing component 260 (e.g. magnetic sensor 114). The electrical power allows the microprocessor component 262 to operate, while the communication component 268 sends data and command signals between the microprocessor component 262 and a remote sprinkler controller (not shown). The magnetic sensing component 260 provides raw sensor data to the microprocessor component, which the microprocessor component 262 in turn analyzes. Finally, the microprocessor component 262 sends control signals to the solenoid driver component 270 (e.g. solenoid 162) causing the sprinkler 100 water flow to activate or deactivate (respectively raising or lowering the riser), and also sends control signals to the stepper motor component 266 (e.g. stepper motor 212) which causes the nozzle assembly 103 to rotate. As the stepper motor component 266 operates, the magnetic sensor component 260 sends data reflecting a change in position of the nozzle assembly 103 to the microprocessor component 262. This sensor data is again analyzed by the microprocessor component 262 and command signals are again sent out to the stepper motor component 266 accordingly to manipulate the position of the nozzle assembly 103. In this respect, a feedback loop is created within the sprinkler 100.

In operation, a microprocessor 107 within the electronic assembly 110 communicates with a central irrigation controller (not shown) to determine the watering program for that individual sprinkler 100. That watering program will include requirements for the arc the sprinkler 100 should rotate, the length of time watering should occur, the time at which to start watering as well as other relevant watering instructions. When the microprocessor 107 reads the watering program and determines that the sprinkler 100 should activate, a calibration cycle is initialized by rotating the nozzle assembly 103 in a complete circle and measuring the magnetic field data with magnet sensor 114. This rotational calibration provides the magnetic sensor 114 with the strongest and weakest magnetic signals in both the X and Y axes, which allows the microprocessor to then calculate the angular position of the nozzle 101.

It is desired that no water exit the nozzle 101 when calibrating, so as to prevent water from being inadvertently sprayed in an unwanted location. Thus, the nozzle assembly 103 may be calibrated in a lowered position prior to activation of the sprinkler pilot valve 150 (seen in FIGS. 5, 6, and 8 and described in further detail below). Note that calibration may also occur when the riser 104 and nozzle assembly 103 are in a raised position with an alternate sprinkler design that includes a second motor for raising and lowering both components without opening the pilot valve 151.

Figure 3A:
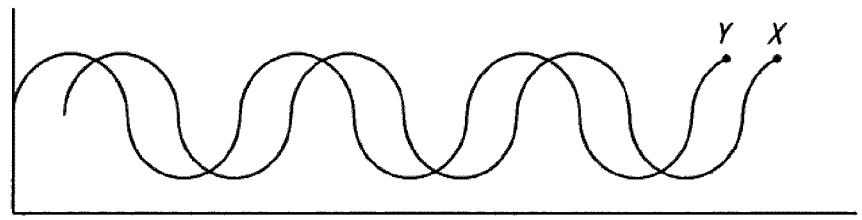
FIG. 3A illustrates a graph of magnetic sensor data of a magnetic sensing sprinkler according to the present invention.

FIG. 3A illustrates example magnetic field signals in the X and Y axis direction for a nozzle assembly 103 continuously rotating in a "popped-up" position. By directing one axis of the two axis magnet sensor 114 towards the axis of rotation of the nozzle assembly 103, the X and Y axis readings form sinusoidal waves that are offset by 90 degrees as nozzle assembly 103 rotates. Measuring both the X axis and the Y axis, the nozzle 101 angle can be mathematically determined or compared against reference data, allowing the microprocessor to accurately execute a watering program, including a desired watering arc.

Figure 3B:
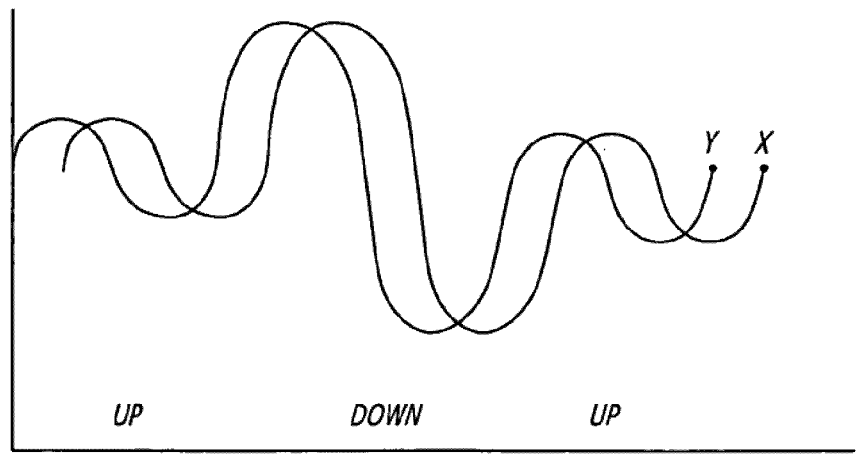
FIG. 3B illustrates a graph of magnetic sensor data of a magnetic sensing sprinkler according to the present invention.

FIG. 3B illustrates example magnetic field signals for a riser 104 and nozzle assembly 103 in a raised and lowered position. Note that when the riser 104 is in a lowered position, the magnet 108 is closer to the magnet sensor 114, thus producing stronger magnetic field signals than in a raised position. The microprocessor 107 may have various magnetic field value thresholds preprogrammed, allowing the microprocessor 107 to detect the position of the nozzle assembly 103 when a magnetic field value passes a threshold. For example, the microprocessor 107 could have preprogrammed upper and lower thresholds which indicate the riser 104 is in fully risen or fully retracted position. Further, if the riser 104 is not in a fully risen or fully retracted position, the microprocessor 107 calculates the position of the riser 104 and alerts a user elsewhere to a potential sprinkler 100 malfunction.

In a specific example of the present embodiment, the two axis magnet sensor 114 is placed off axis of the nozzle assembly 103 and magnet 108, as seen in FIG. 1B. One sensing axis of the two-axis magnet sensor 114 is pointed at the axis of rotation of the magnet 108 which allows the magnetic field data collected from the magnet sensor 114 to form an X and Y sinusoidal wave, 90 degrees out of phase, as seen in FIG. 3A. The magnetic field values obtained by the magnet sensor 114 are normalized, then compared to a set of normalized reference values (which could be as simple as using the arc tan function available in many microprocessor programming languages), allowing the microprocessor 107 to determine the rotational position of magnet 108 in reference to the sprinkler body 102 and magnetic north.

An initial calibration phase may be performed upon installation or prior to activation, which generally includes collecting raw reference data and various correction factors which will later be applied to this raw reference data. Initially during this calibration phase, the magnet sensor 114 determines the zero magnetic field value (the X-Y sensor values that correspond to a state of zero X and Y magnetic fields).

Next, the magnet sensor 114 generates raw magnetic field reference data by rotating the nozzle assembly 103 360 degrees and recording the data. Alternatively, this reference data may be obtained by rotating the nozzle assembly 103 through a portion of the rotational arc of the nozzle assembly 103 and mathematically extrapolating the additional data. For illustrative purposes, example raw reference data has been plotted on an X-Y graph in FIG. 4A, and forms an overall ellipse shape.

Figure 4A:
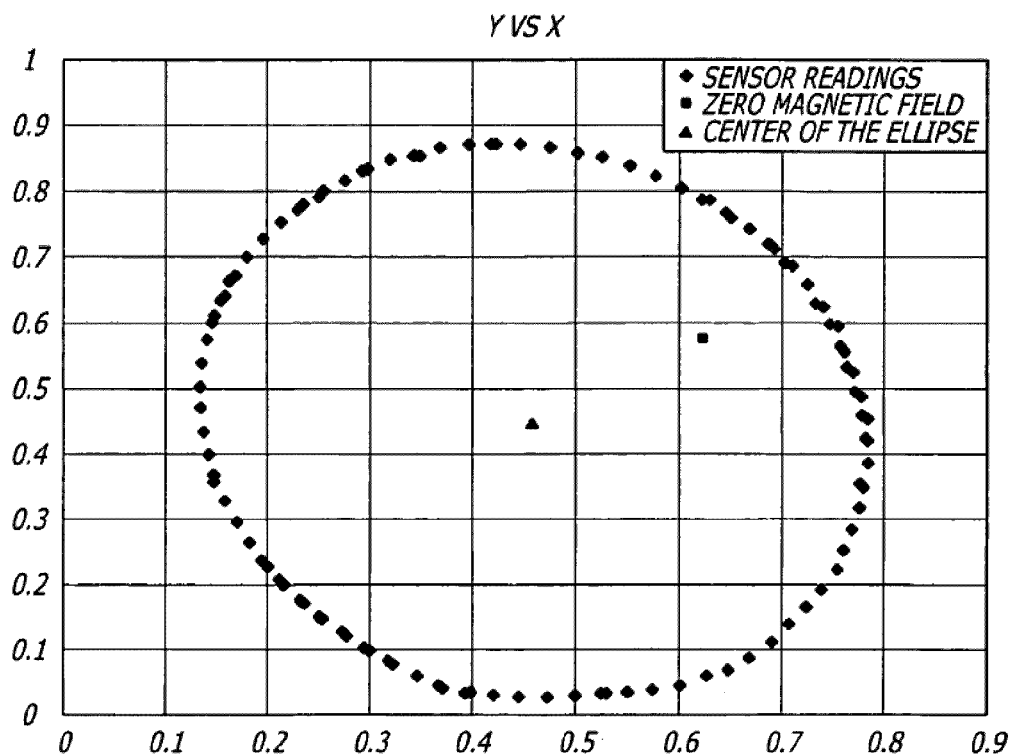
FIG. 4A illustrates a graph of raw rotational magnetic sensor data according to the present invention.
Figure 4B:
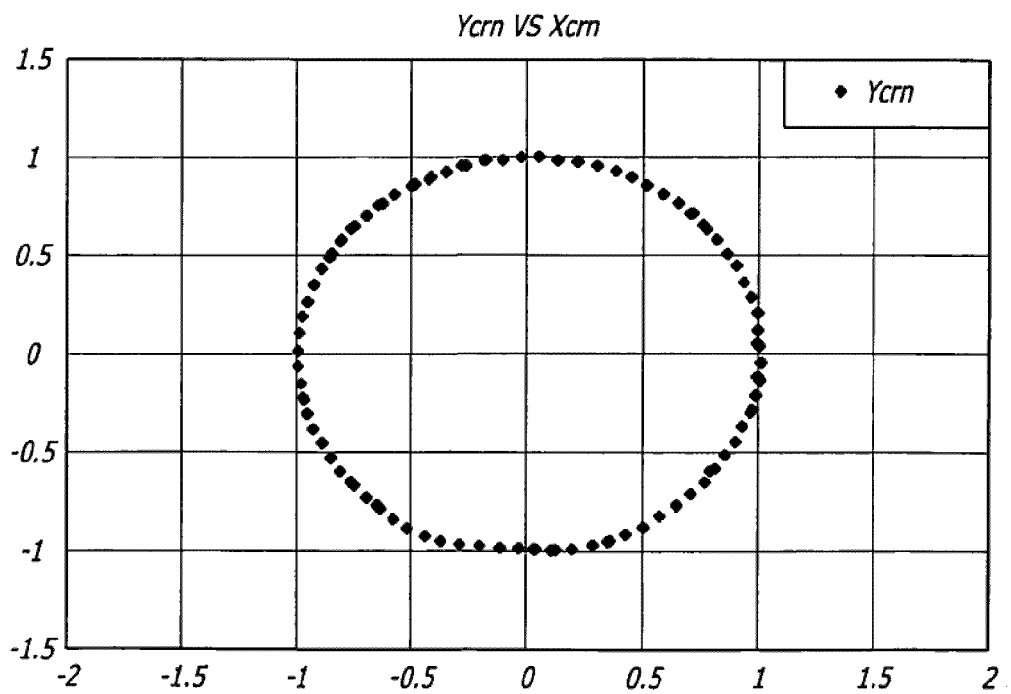
FIG. 4B illustrates a graph of normalized magnetic sensor data according to the present invention.

At this point, the microprocessor 107 has determined a raw data set and the zero magnetic field value. Next, a refined reference data set is determined, as seen in FIG. 4B, by centering, rotating, and normalizing the raw reference data set.

The raw data is centered by first calculating the center of this ellipse shape (seen in FIG. 4A) and is normalized by adjusting all reference data points so the ellipse center is now zero along both axes. The ellipse center may be calculated, for example, by a "least squares fit" technique. Since the Earth's magnetic field offsets each X-Y magnetic field data point by the same amount, the center of the ellipse also represents the value of the Earth's magnetic field. Once this value is found, all raw reference data points are shifted so that the ellipse center is 0 along both axes, seen in FIG. 4B.

Next the raw data is rotated. Ideally, the raw reference data set will not need to be rotated and the major and minor curves of the ellipse will fall directly on the X or Y axis. However, a slight misalignment of the magnet sensor 114 axis pointed towards the axis of rotation of the nozzle assembly 103 may often occur due to imperfections in the magnet sensor 114, soldering of the magnet sensor 114 to a circuit board, or other physical misalignments. These physical misalignments cause a virtual misalignment of the ellipse reference data from the X and Y axes, as seen in FIG. 4A. FIG. 4B illustrates this reference data in a rotated orientation with the major and minor curves along the X and Y axes. For example, this rotation may be performed by adjusting all of the reference data points so the highest/lowest values possible of the data line up along the X and Y axes.

Once the major and minor diameters align with the X and Y axes, the data is normalized by dividing the X and Y values for each point by half of the major and minor diameters of the ellipse, respectively. A "least squares fit" technique may be used on raw data points that represent either a full circle or partial circle and will yield, simultaneously, the ellipse center, the rotation angle, and the major and minor angle. As the reference data set becomes larger, the more accurate these valves can be determined using this technique.

Thus, FIG. 4B illustrates the "adjusted" data which has been centered, rotated, and normalized. When non-reference data is acquired by the magnet sensor 114, it is "adjusted" by the same process as described for the reference data. (The process was applied to the reference data just to prove that it accomplished what was intended, which is to map each point onto (very near to) the unit circle. The angle of a point on the circle relative to the X axis is equal to the angle of the nozzle relative to the position of the sensor, which is fixed relative to the body. The whole purpose of the reference data is to determine the ellipse center, the rotational misalignment of the sensor, and the major and minor diameters of the ellipse so the any data point can be mapped onto the unit circle. Since the X and Y values of the "virtual" point at the center of the ellipse correspond to the Earth's magnetic field, we can calculate the angle between the sensor and magnetic North. Then adding this angle to the angle ((as determined above) between the nozzle and the sensor yields the angle of the nozzle relative to magnetic North.)

Finally, a reference point must be determined between the reference data of FIG. 4B and the real physical world. In the case of the sprinkler body 102, this may be accomplished by preprogramming the microprocessor with reference thresholds relating to a specific position, such as aligning the body with a landmark during installation or by measuring the angle between the body and some landmark (even magnetic North) after installation, and then manually entering this data (this process could be automated with the correct auxiliary equipment). Thus, the position of the magnet 108 (and therefore the nozzle 101) is known relative to the magnetic sensor 114 (and therefore the body 102) whose position is known relative to the real physical world.

In addition to the sprinkler body 102 reference point, the Earth's magnetic North may be used as an alternative or additional reference point. The value and direction (i.e. the vector) of the Earth's magnetic field relative to the sensor may be determined by creating a vector between the zero magnetic field point and the center of the ellipse, both of which can be seen in FIG. 4A. By adding this angle to the angle of the nozzle relative to the sensor as calculated above, the microprocessor 107 may calculate angle between the magnet 108 and the Earth's magnetic North.

This positional difference from magnetic North may be utilized with a remotely located sprinkler controller for sprinkler 100 orientation purposes. For example, the sprinkler controller may record the angle between magnetic North and a reference point on the sprinkler body 102. When this value changes, the position or orientation of sprinkler body 102 has been reoriented (for example by a maintenance crew, by vandals or mechanical malfunction), which may send a warning to the user and possibly deactivate that particular sprinkler 100, preventing damage from undesired irrigation. In a similar manner, the arc limits can be referenced against magnetic North, to determine if one of the arc limits has slipped. For example, if one reference angle value between magnetic North and an arc setting changes, but the other arc setting has not changed, a user may be alerted by the central controller that one of the arc settings has slipped or malfunctioned. Alternately, a recalibration could be performed. This would determine what the actual current orientation of the body is and if the arc limits are still acceptable. If the arc is correct but the arc limits have changed, the whole body was rotated. If the arc has changed, but it is known that it needed to be adjusted, the adjustment will be verified to be correct. If the arc is incorrect, the sprinkler needs to be serviced. At this point, the user knows of the potential problem, and can decide what parts and tools need to be taken to the site.

Additionally, the magnetic North reference point may be sent to a central sprinkler controller which correlates the magnetic North reference point, the nozzle assembly 103 position data, physical sprinkler position data, and a geographic map to provide a sprinkler control map. This sprinkler control map may illustrate the location of each sprinkler 100 on a geographic map, as well as the direction each sprinkler 100 is currently watering.

Figure 4C:
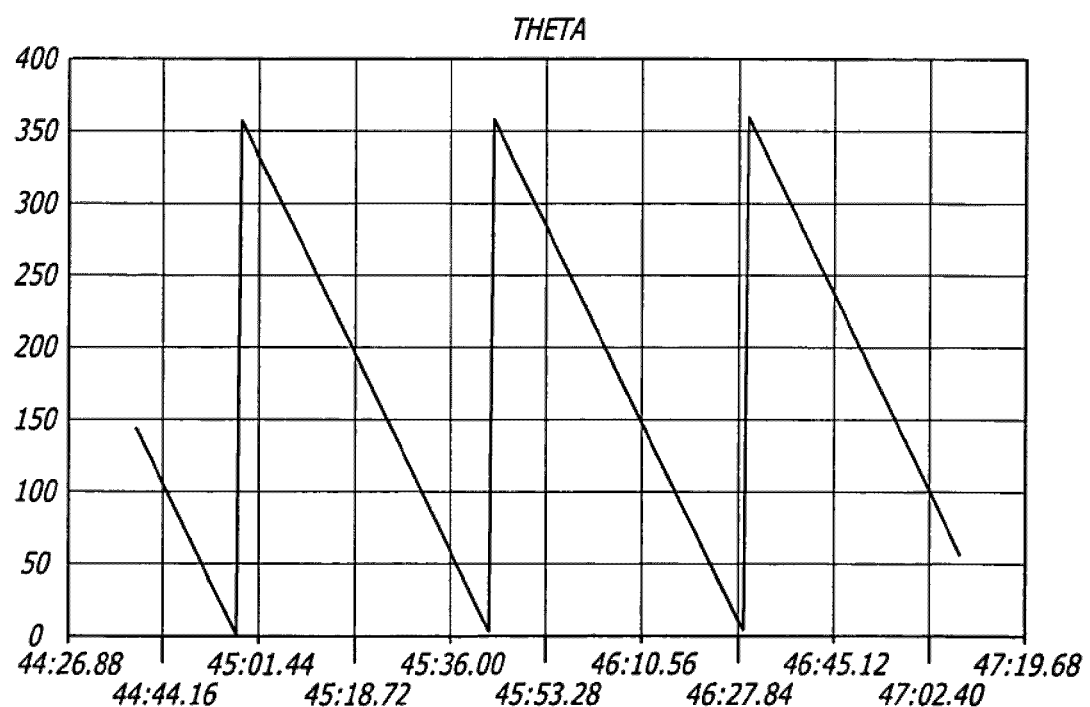
FIG. 4C illustrates a graph of rotational angle data according to the present invention.

FIG. 4C illustrates a graph of example data of the rotation degrees of magnet 108 verses time. Specifically, this example data illustrates the magnet 108 rotating in continuous circles. Using this information, the microprocessor 107 may determine the speed and direction of rotation of the nozzle assembly 103. This riser data may be communicated to a central controller, allowing a user to monitor and ultimately control different aspects of the sprinkler nozzle assembly 103 and sprinkler 100 performance. For example, a user may remotely monitor the position and rotational speed of the nozzle 101 of nozzle assembly 103 and decide to modify the rotational speed of the nozzle assembly 103.

Once the calibration has finished and the position of the nozzle 101 has been determined, the microprocessor executes the watering program, watering within a desired arc radius for a determined amount of time. For example, the nozzle 101 can be directed by the watering program to complete a desired number of complete traverses of the arc to be watered, therefore providing a more even watering pattern. When complete, the microprocessor shuts off the water flow to the nozzle 101, lowering the riser 104. Preferably, the nozzle 101 is returned to a specific known angle to allow the calibration for the next watering cycle to be performed more predictably. Additionally, returning to a specific known angle provides more uniform water coverage since the watering cycle may be stopped after a full arc sweep, instead of only a portion of a desired watering arc.

For example, this even watering arc could be performed by sensing the position of the nozzle 101 when a "stop" signal is sent to the sprinkler. If the nozzle 101 is not at one end of the set watering arc, the nozzle 101 continues to irrigate until the nozzle assembly 103 reaches one of the set watering arc ends. Alternatively, the microprocessor 107 may adjust the speed of nozzle assembly 103 rotation to allow a whole number of sweeps through a desired watering arc during a desired watering time. Thus, at the end of the watering cycle, the nozzle 101 will be angled at an end of the watering arc and an equal amount of water will have been delivered to the turf within the sprinkler 100 watering arc, including during the beginning and end of the watering cycle.

It should be noted that the magnetic field of the Earth or various metal deposits below the ground may alter the magnetic field data obtained by the magnet sensor 114. However, in most cases calibration of the sprinkler will overcome any such magnet sensor 114 variations.

Although the above described embodiment is a preferred method of achieving the present invention, other preferred embodiments are possible without departing from the present invention. For example, a Hall effect sensor may be used as the magnet sensor 114.

In another preferred embodiment of the present invention (not shown), a plurality of switches are positioned around the nozzle assembly 103 within the stationary portion of sprinkler 100 as a single trigger on the nozzle assembly 103 rotates along with the nozzle assembly 103, turning each switch on or off as it passes. These signals are then detected by the microprocessor 107 and, with the help of a timer device (not shown) translated into a rotational speed.

The angular position of the nozzle 101 of the nozzle assembly 103 may be determined by allowing the microprocessor 107 to count the number of times a switch has been actuated as the nozzle assembly 103 rotates. This allows the microprocessor 107 to determine the initial starting position. As the nozzle assembly 103 rotates during the normal course of operation, the microprocessor 107 counts the subsequent switch actuations and, depending on the number of switchers, calculates the angular position of the nozzle 101. Alternatively, each switch may be preprogrammed to correlate to an angular position of the nozzle 101 (or other reference point) and the overall orientation of the sprinkler 100 may be installed at a known relative orientation.

The switches may be magnetic "pickup" switches, light emitting components (e.g. LED's and light detectors), mechanical switches, or other switches. Preferably, the switches for determining rotation are positioned to potentially activate when the riser 104 and nozzle assembly 103 are in a fully risen position, allowing the switches to switch as the nozzle assembly 103 rotates.

To detect the vertical position of the riser 104, yet another switch is mounted to the sprinkler 100 body to detect the position of any of the triggers on the nozzle assembly 103 body.

In another preferred embodiment of the present invention (not shown), a single switch may be positioned within the sprinkler 100 while a plurality of triggers or pickups may be positioned on the nozzle assembly 103. In this embodiment, each trigger sends a different signal back to the microprocessor 107 which then determines the direction of the nozzle 101, the speed of rotation of the nozzle 101, and the height of the nozzle assembly 103 in a similar fashion to the previously described embodiment.

In summary, the detection and monitoring of the angular and vertical position of the nozzle 101 through the use of the use of the onboard microprocessor 107 allows the use of feedback control of the sprinkler 100 with the central controller. This offers a far more versatile sprinkler system insofar as each sprinkler 100 can be individually programmed and controlled for precise watering. For example, the same sprinkler 100 can be used for two different turf sections that may have different watering needs.

Sprinkler Body with Compartments

Figure 14:
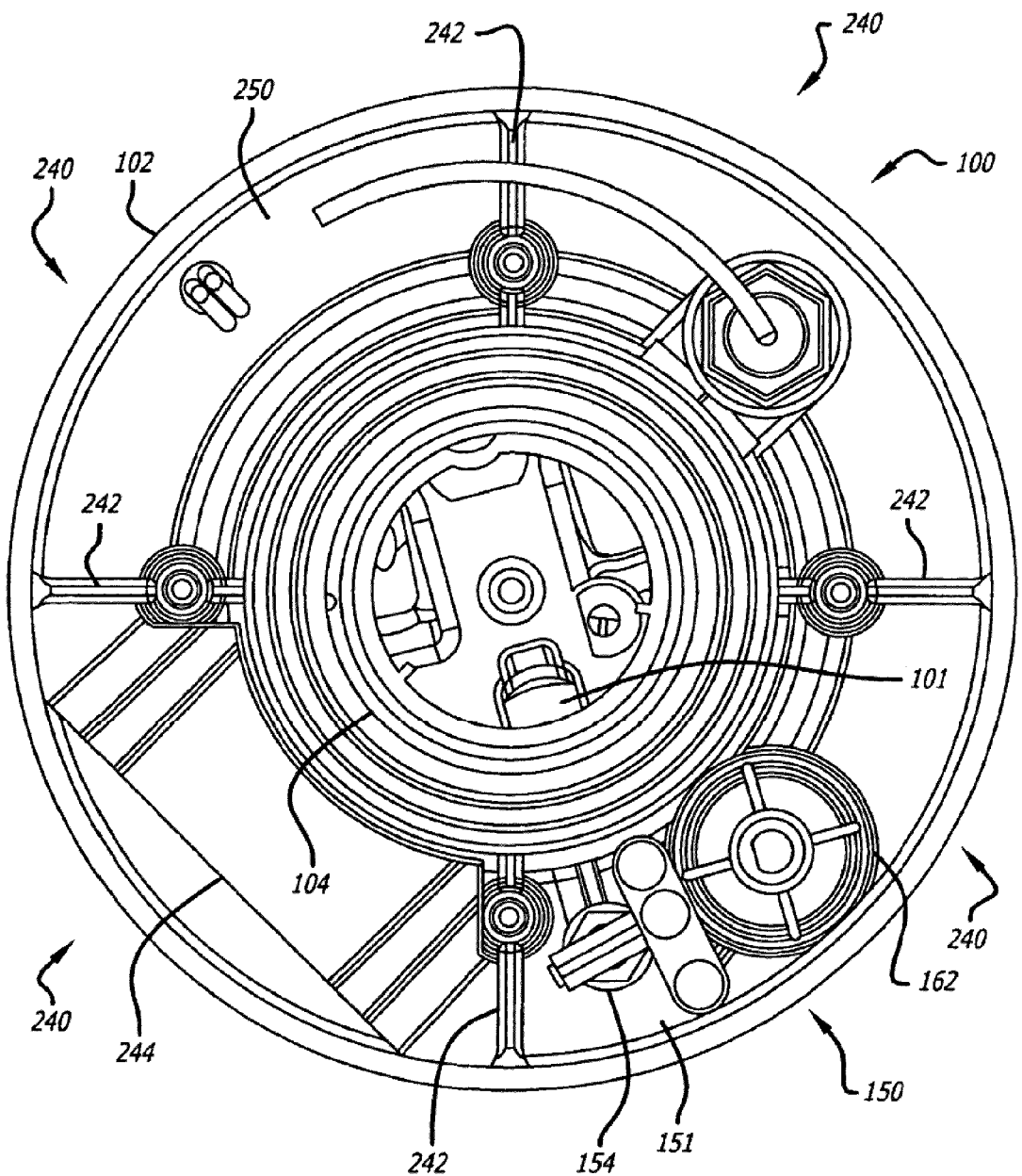
FIG. 14 illustrates a top view of the sprinkler of FIG. 1A.

Referring now to FIGS. 1A, 1B, and 14, a plan view of the sprinkler body 102 can be seen according to the present invention, having body compartments 240. These body compartments are located within the outer section of sprinkler body 102 for containing sprinkler components that are not by design located on the inside of the main body of the sprinkler 100. Thus, these components may be accessed by simply removing the sprinkler cover 248, instead of digging such components up from the ground as prior art models required.

The body compartments 240 have compartment walls 242 integrally molded with the sprinkler body 102 and a separate removable compartment floor which is preferably attached to the body compartment walls 242 with fasteners. Such separately manufactured compartment floors 250 allow for various configurations to fit different components installed into the compartments without disturbing or affecting the compartment configuration or manufacturing process. Thus, previously installed sprinklers may be modified with a different compartment floor to allow for installation of various components that would not fit the original compartment floor 250.

Optionally, the compartment floor 250 may be integrally molded as part of the bottom of the compartments. Such a unitary molded part reduces costs associated with having multiple body compartments, as well as reduces the reject rate associate with the reduction of manufacturing steps.

Alternately, the body compartments 240 may preferably be created by individually molded compartment inserts 242a, as seen in FIG. 16. The compartment inserts 242a may be attached to the exterior wall of sprinkler body 102 through mechanical fastening, bonding, ultrasonic welding, or other fastening methods and may have varying sizes, encompassing different radial portions of the outer sprinkler body 102. As seen in FIG. 16, these inserts preferably have a locking groove 241, allowing the user to slide the inserts 242a in place. These compartment inserts 250 may optionally have individual compartment floors 250a, as seen in FIG. 26, or utilize a single compartment floor 250b in common, as seen in FIG. 27.

Prior art sprinklers often incorporated a "flange" at the top of the body to prevent lateral movement in the ground and to reduce downward sinking into the dirt due to pressure from yard equipment riding over the sprinkler body. As seen in FIGS. 1A, 5, 6, and 7, the body compartments 240 may not extend the entire length of the sprinkler 100. This creates a narrowed region underneath the body compartments 240. The bottom area of the compartments therefore acts as a mechanism to prevent sinking, providing lateral support normally associated with the flange.

Check Valve

Figure 5:
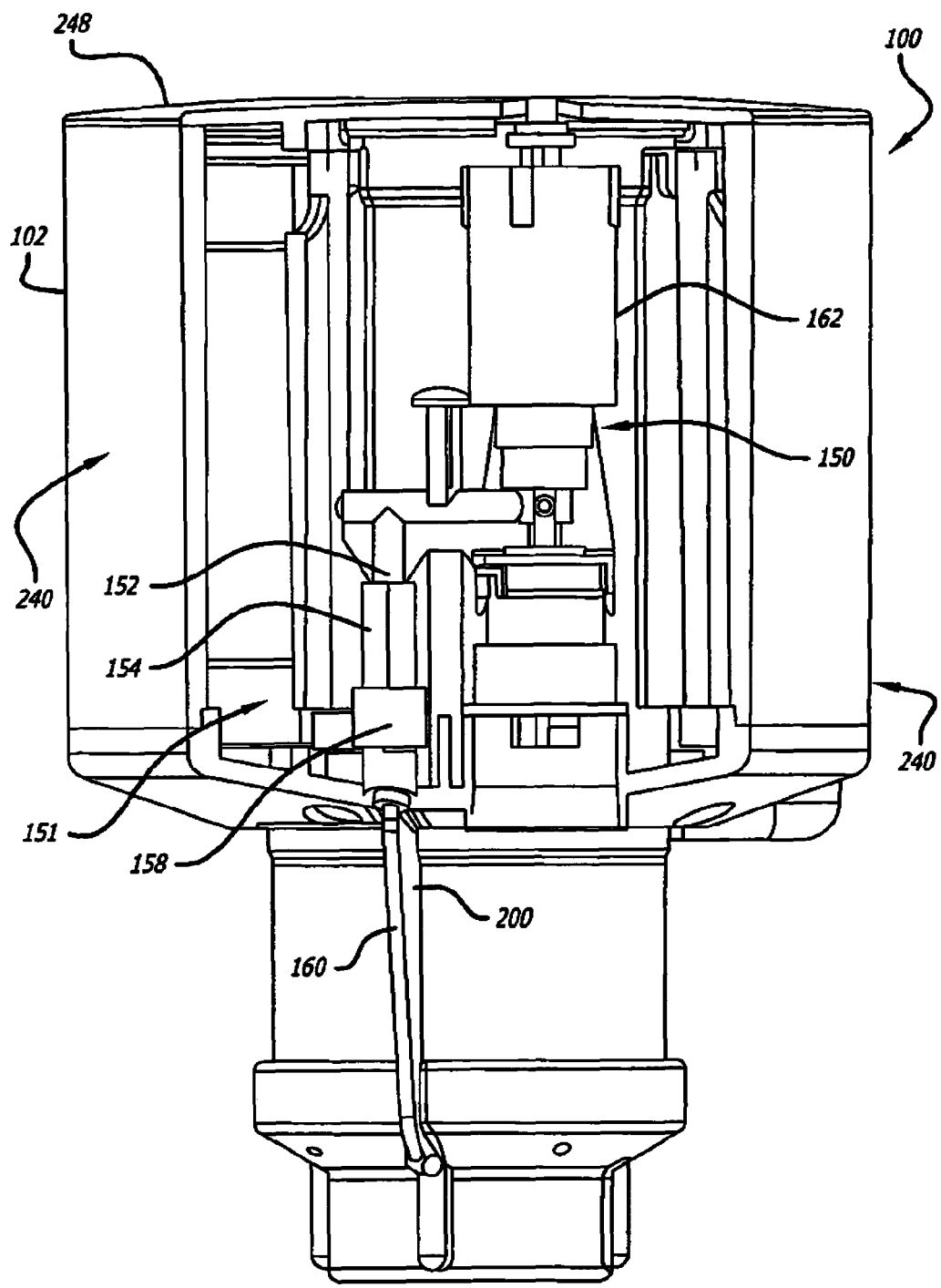
FIG. 5 illustrates a cutaway view of the sprinkler of FIG. 1A.
Figure 6:
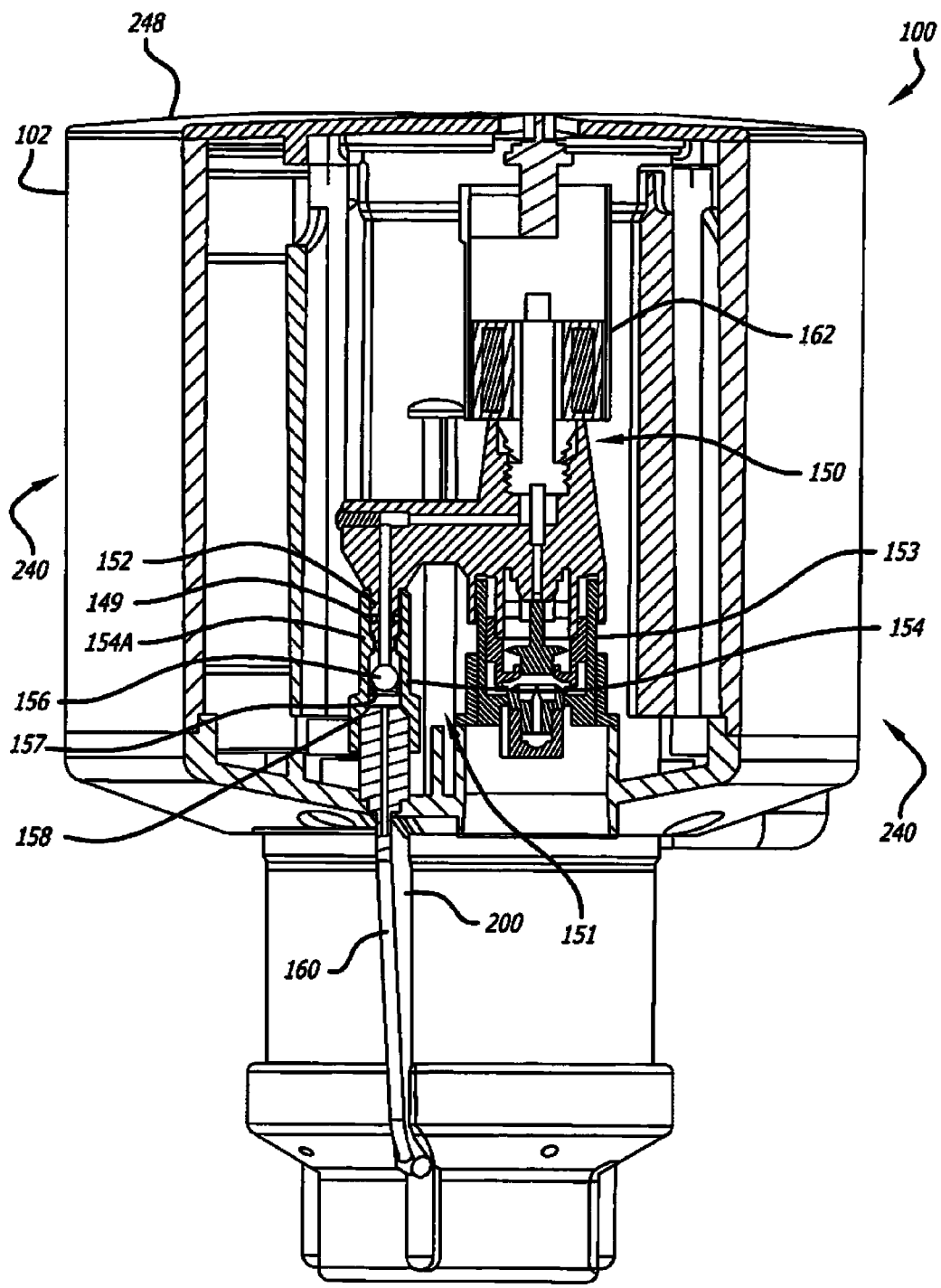
FIG. 6 illustrates a cutaway view of the sprinkler of FIG. 1A.
Figure 7:
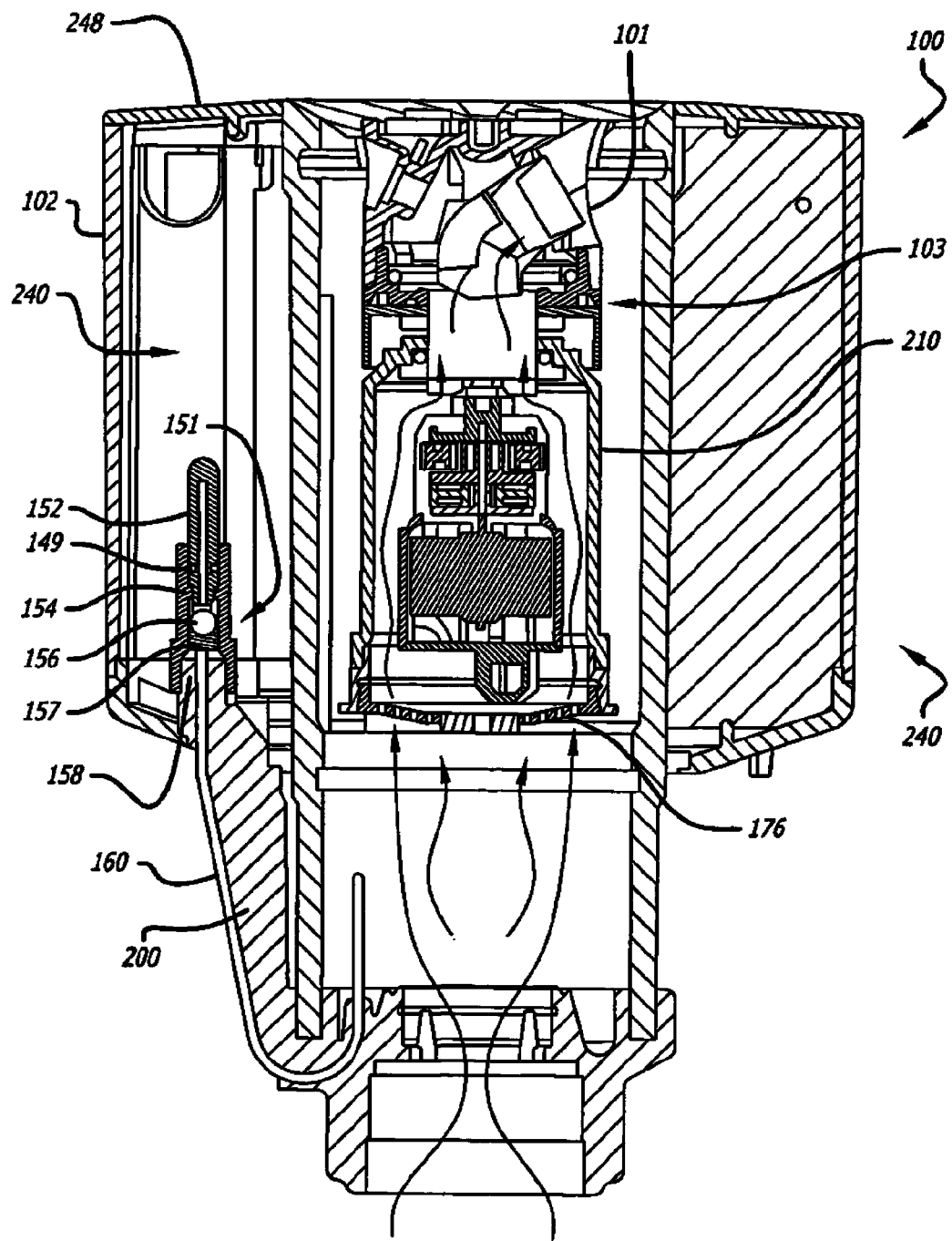
FIG. 7 illustrates a cutaway view of the sprinkler of FIG. 1A.

Turning now to FIGS. 5-7, a check valve 151 is illustrated according to the present invention which allows a sprinkler pilot valve 150 to be removed from a sprinkler 100 without shutting down the irrigation water supply of the sprinkler 100. When the pilot valve 150 is removed from the sprinkler 100, the check valve 151 maintains the main valve cylinder 168 in a closed position, preventing water-flow though the sprinkler 100.

Typically, pilot valves are used to actuate a water supply to an irrigation sprinkler, thus serving as an "on" or "off" switch. Such pilot valves are commonly connected to irrigation water conduits upstream of the sprinkler or integrated into the sprinkler as seen in the commonly owned and currently pending U.S. patent application Ser. No. 10/774,705, filed Feb. 9, 2004, entitled Sprinkler System and in U.S. patent application Ser. No. 10/789,862, filed Feb. 27, 2004, entitled Low Flow Valve Improvement, of which the contents of both applications are hereby incorporated by reference. Often, pilot valves have a solenoid which may be electrically actuated by way of low voltage electrical current. This electrical activation allows water flow to a sprinkler to be turned on from a remote location, such as, for example by according to a watering program of an irrigation controller.

Figure 8:
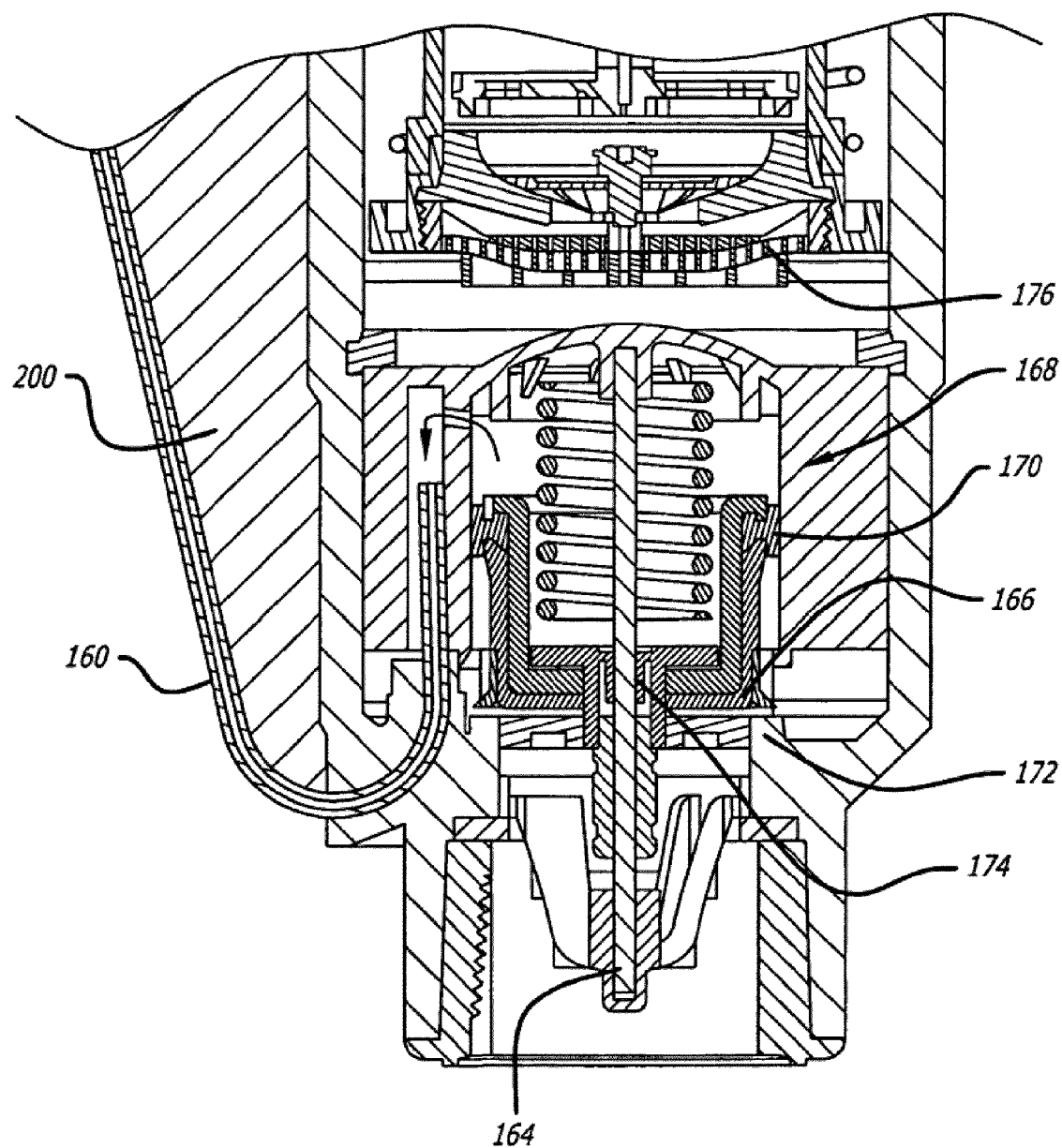
FIG. 8 illustrates a cutaway view of a portion of the sprinkler of FIG. 1A.

As seen best in FIGS. 6 and 8, a pilot valve 150 typically is connected to a main valve cylinder 168 through a communication tube 160. The valve cylinder 168 has valve seals 170, which form a sealed chamber within the valve cylinder 168. The main valve cylinder 168 prevents the flow of water into the sprinkler 100 when in a lowered position so that the valve bottom 166 presses against valve seat 172. Alternately, water flow into the sprinkler 100 is no longer prevented when the main valve cylinder 168 moves to a raised position, lifting the valve bottom 166 away from the valve seat 172.

The raised or lowered position of the main valve cylinder 168 is controlled by varying the pressure within the main valve cylinder 168. An increased pressure within the main valve cylinder 168 holds the valve bottom 166 against the valve seat 172 in a lowered, closed state, while reduced or no relative pressure within the main valve cylinder 168 allows the valve bottom 166 to be pushed upwards to an open state by the water coming into the sprinkler.

A metering pin 164 allows a small volume of water into the main valve cylinder 168 through a gap 174 between the metering pin 164 and the main valve cylinder 168. With water entering the main valve cylinder 168, pressure within the main valve cylinder 168 increases.

The communication tube 160 connects the inside of the main valve cylinder 168 to the check valve 151 and ultimately on to a pressure relieving mechanism 153 controlled by the solenoid 162, seen best in FIG. 6. When the pressure relieving mechanism 153 is closed, pressure builds within the main valve cylinder 168. When the solenoid 162 is energized and the pressure relieving mechanism 153 vents, pressure is relieved within the main valve cylinder 168, allowing the valve bottom 166 to be pushed upwards to an open state by the incoming water supply.

As previously stated, the check valve 151 allows a user to remove the pilot valve 150 from a sprinkler 100 without the need to shut down the water supply upstream of the pilot valve 150. As best seen with reference to FIGS. 6 and 8, the check valve 151 is generally located between the main valve cylinder 168 and the pilot valve 150. The communication tube 160 connects the inner chamber of the main valve cylinder 168 with the check valve 151, while the check valve 151 is connected to the pilot valve 150. Thus a continuous passage links the inner chamber of the main valve cylinder 168 with the pilot valve 150.

The check valve 151 is composed of four main elements: check ball retainer 158, check ball 156, spring 157 and check valve housing 154. The check ball 156 is positioned within the check valve housing 154 while the check ball retainer 158 is located at the bottom portion of the check valve housing 154. In this manner, the check ball retainer 158 prevents the check ball 156 from falling out of the check valve 151 when the check valve 151 is removed for repair or replacement. The spring 157 provides a biasing pressure on the check ball 156, pressing the check ball 156 against the flanged portion 154a of check valve housing 154 when the check valve 151 closes. A nozzle tip 152 of the pilot valve 150 fits within the top aperture of the check valve housing 154, forming a tight seal between both. Additionally, an O-ring 149 is positioned around the nozzle tip 152 so as to contact the check valve housing 154. The check valve 151 seals prior to hydraulically releasing the O-ring 149 and opens after the nozzle tip 152 and the O-ring 149 hydraulically engage the top aperture of the check valve housing 154. For example, the distance between the flanged portion 154a and the O-ring 149 is equal to or greater than the distance between the check ball 156 and the flanged portion 154a in an open position. Thus, as the nozzle tip 152 is pulled upward, the check ball 156 seals against the flanged portion 154a before the hydraulic seal between the top aperture of the check valve housing 154 and the nozzle tip 152 with the O-ring 149 is broken. In this respect, water is prevented from escaping when the nozzle tip 156 is removed.

Referring to FIGS. 5-8, in operation, water from an irrigation water supply flows into the sprinkler 100. Some of this water then flows into the inner chamber of the main valve cylinder 168 through the gap 174 created by metering pin 164. Once inside the inner chamber of the main valve cylinder 168, the water continues on through the communication tube 160, to the check valve 151 where it pushes the check ball 156 upward within the check valve housing 154. If the nozzle tip 152 of the pilot valve 150 is positioned within the check valve housing 154, the check ball 156 will press against the nozzle tip 152, but will not block further passage of the water into the pilot valve 150. Thus, the pilot valve 150 is free to create or relieve pressure to operate the main valve cylinder 168 as previously described.

However, if the nozzle tip 152 is removed from the check valve housing 154, i.e. if the pilot valve 150 is removed from the sprinkler 100 (e.g. for servicing or repair), the check ball 156 presses against a flanged portion 154a within the check valve housing 154, creating a seal which blocks water passage out of the top aperture of the check valve housing 154. Thus, the check valve 151 maintains water pressure within the main valve cylinder 168 when the nozzle tip 152 is removed from the check valve 151, preventing the main valve cylinder 168 from allowing water to pass into the main portion of sprinkler 100. Thus, when a user desires to remove the pilot valve 150 from the sprinkler 200, the irrigation water supply to the sprinkler 100 may be left on and the pilot valve 150 may simply be removed, since the check valve 151 will prevent the main valve cylinder 168 from opening and spraying water from the nozzle of the sprinkler 100.

The spring 157 may optionally be included between the check ball 156 and the check ball retainer 158, biasing the check ball 156 up against the flanged portion 154a of the check valve housing 154. Thus, even when there is little or no water pressure, the check valve 151 will be biased closed unless otherwise opened by the nozzle tip 152. The spring 157 also assists in assuring that the ball 156 seats against the flanged portion 154a of the check valve housing 154, as the ball 156 may, at times, not seat due to low differential water pressure and therefore continue to flow when the nozzle tip 152 is removed.

Figure 9A:
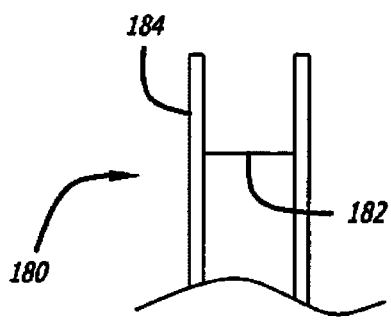
FIGS. 9A-9B illustrate a cutaway view of a check valve according to the present invention.
Figure 9B:
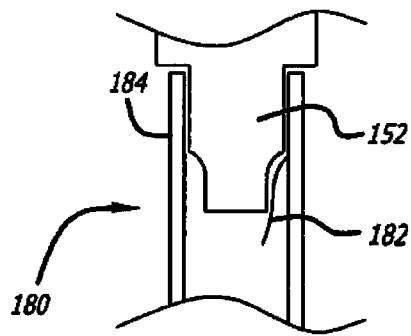

Although, check valve 151 utilizes a check ball 156, other embodiments are possible according to the present invention. For example the alternative preferred embodiments of FIGS. 9A and 9B illustrate a check valve 180 having a flexible leaflet valve 182, which is enclosed within the check valve housing 154. The leaflet valve 182 is hinged to open only towards the inlet of the check valve housing 184. Thus, water entering the check valve 180 force the leaflet valve 182 closed. As seen in FIG. 9B, the nozzle tip 152 of the pilot valve 150 pushes the leaflet valve 182 open, allowing water to flow through to the pilot valve 150.

Figure 10A:
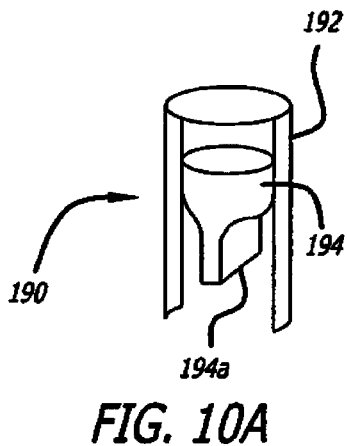
FIG. 10A illustrate a cutaway view of a check valve according to the present invention.
Figure 10B:
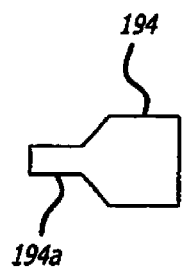
FIGS. 10B-10C illustrates a side view of a valve member of the valve of FIG. 10A.
Figure 10C:
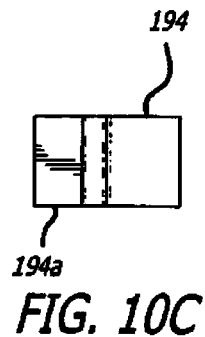

FIGS. 10A-10C illustrate yet another alternative preferred embodiment of a check valve 190 according to the present invention, having a duck bill valve 194 within check valve housing 192. The duck bill valve 194 is positioned with the flexible bill section 194a towards the inlet of the check valve 190. Water entering the check valve 190 is unable to pass the duck bill valve 194 since the water pressure forces the duck bill valve 194 closed. The duck bill valve 194 opens when the nozzle tip 152 is inserted into the check valve 190, and further into the duck billed valve 194, opening the valve and allowing water to pass into the pilot valve 150.

Figure 11A:
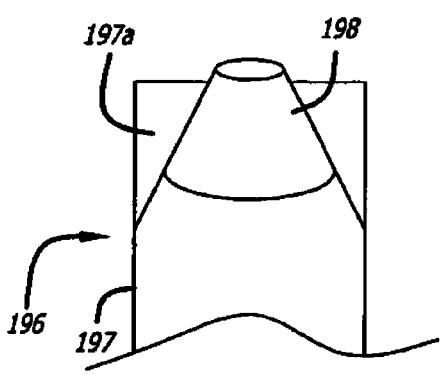
FIGS. 11A-11b illustrate a cutaway view of a check valve according to the present invention.
Figure 11B:
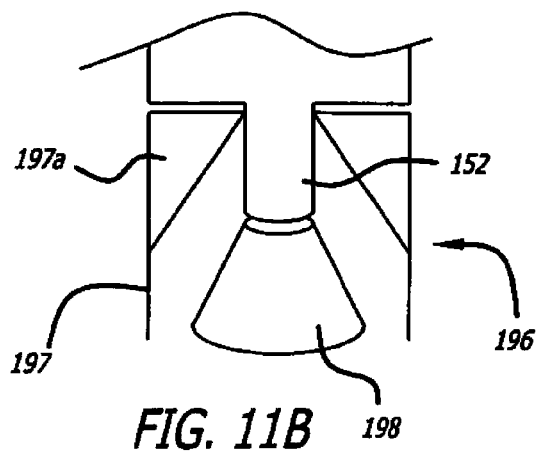
Figure 13:
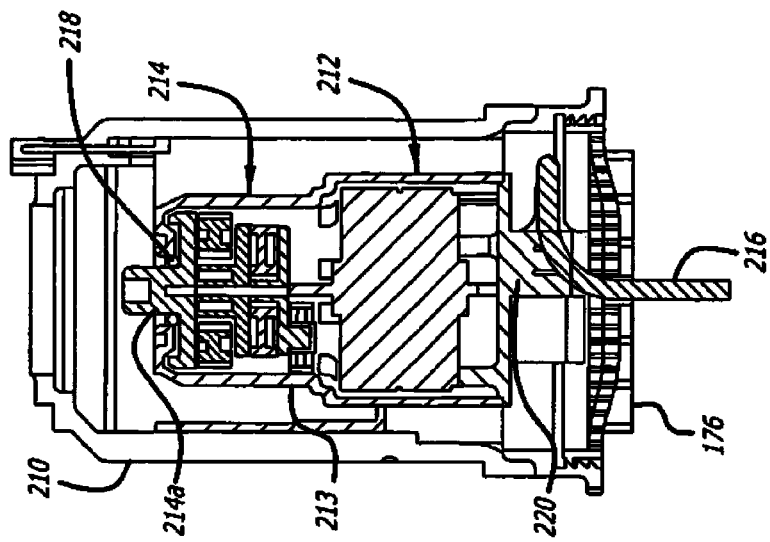
FIGS. 12A-13 illustrate a cutaway view of a motor housing according to the present invention.
Figure 12B:
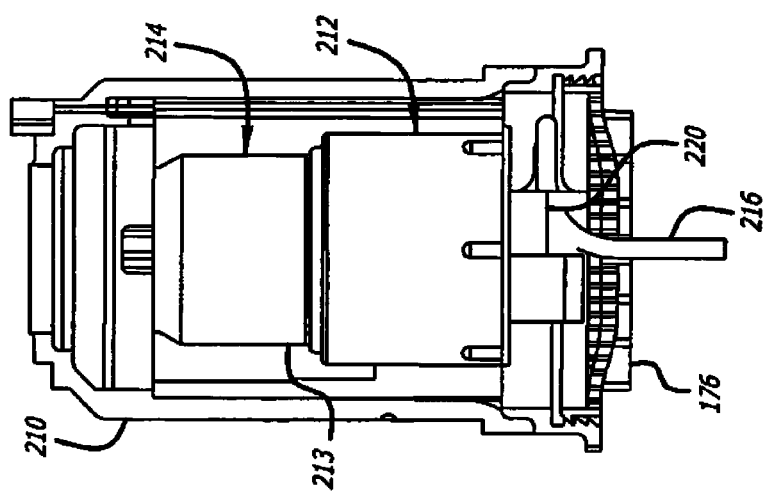
Figure 12A:
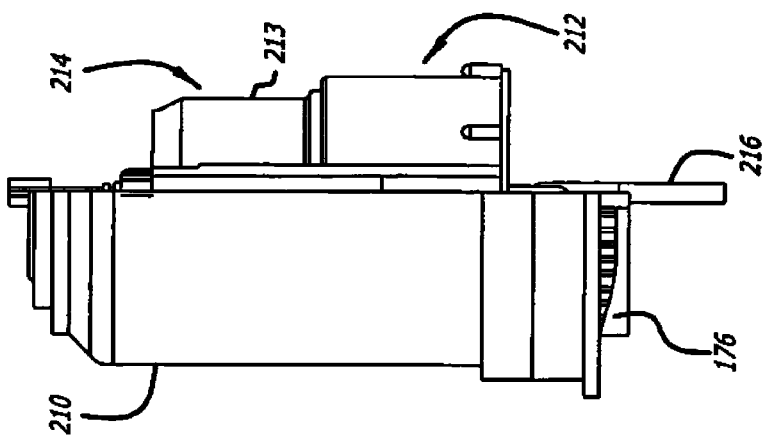

Turning now to FIGS. 11A-11B, a check valve 196 is illustrated according to the present invention, having a conical valve member 198 positioned within the check valve housing 197. The smaller diameter end of conical valve member 198 is angled towards the outlet of check valve housing 197, while the larger diameter end is angled towards the inlet of check valve housing 197. The water pressure pushes the conical valve member 198 against the angled inner flange 197a in check valve housing 197, closing the check valve 196. As with previously described embodiments, the nozzle tip 152 of pilot valve 150 is inserted into the check valve 190, moving the conical valve member 198 away from the angled inner flange 197a, thus opening check valve 196 to allow water to flow into the pilot valve 150.

Figure 18:
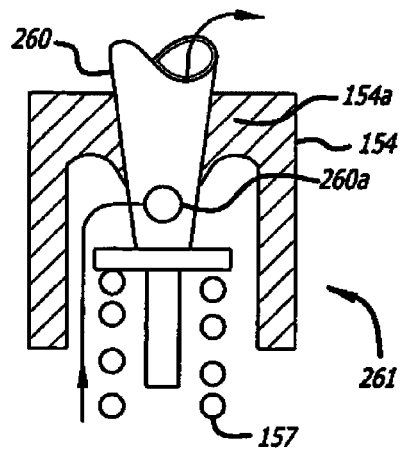
Figure 19:
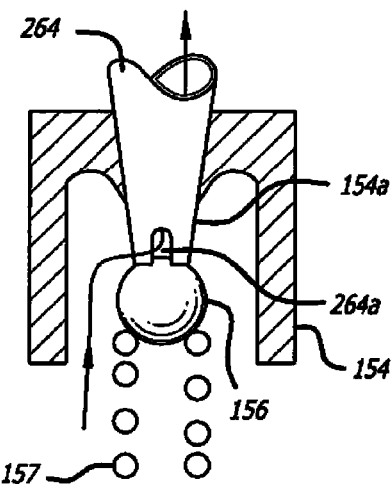
FIGS. 19-21 illustrates a side view of an alternate preferred embodiment of a check valve and pilot valve nozzle tip according to the present invention.
Figure 20:
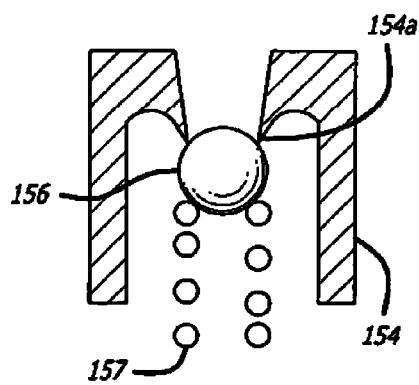
Figure 21:
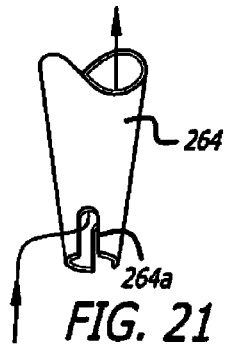
Figure 22:
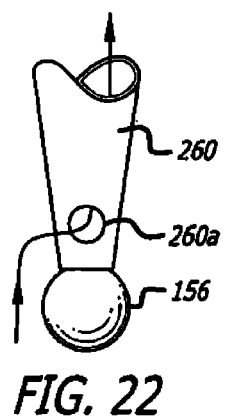
FIGS. 22-23 illustrates a side view of a valve according to the present invention.
Figure 23:
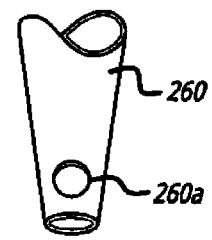

Preferably, the nozzle tip 152 of the pilot valve 150 is configured to prevent water from exiting the check valve 151 when the nozzle tip 152 is inserted or removed from the check valve 151. This shape ensures that the main valve cylinder 168 remains completely closed, preventing the riser 104 from popping up and even small amounts of water from spraying out of the nozzle 101 of the sprinkler 100. The nozzle tip 152 is configured such that water is allowed to enter through the center of the nozzle tip 152, even when the nozzle tip is pressed against the check ball 156 when inserted within the check valve housing 154. FIGS. 19-21 illustrate one preferred design of a nozzle tip 264, having an arching water entry port 264a. Even when the check ball 156 is pressed against the bottom of nozzle tip 264, water may still pass into the nozzle tip 264 and further into the check valve 151. FIG. 20 illustrates the check valve housing 154 without the nozzle tip 264 engaged. FIGS. 18, 22 and 23 illustrate a similar nozzle tip 260 design, having a circular water port 260a which allows the water to enter the tip despite being pressed against the check ball 156.

Figure 17:
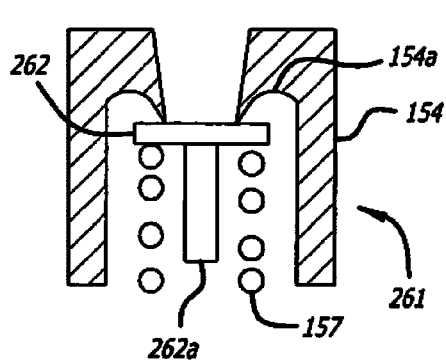
FIGS. 17 and 18 illustrates a side view of an alternate preferred embodiment of a check valve and pilot valve nozzle tip valve according to the present invention.

FIGS. 17 and 18 illustrate another embodiment of a check valve 261 of the present invention, including a disk 262 composed of resilient material and a stem 262a which is centrally located and downwardly angled from the disk 262. The disk 262 seats against the flanged area 154a of the check valve housing 154 when the nozzle tip 152 is removed from the check valve 151. The spring 157 contacts the disk 262, thereby biasing it upwards against the flanged area 154a to a closed position. The check valve 261 is opened when the nozzle tip 152 pushes the disk 262 downward, against the bias of spring 157, which allows water to flow into the nozzle tip 152 and into the pilot valve 150.

Rigid Communication Tube

Turning now to FIGS. 5-8, a communications tube 160 is shown according to the present invention, constructed from a rigid material such as stainless steel, but may be made of any rigid metal or plastic material impervious to corrosion. Since the communications tube 160 may be located at least partially outside the sprinkler 100, the rigid nature of the tube 160 protects the communications tube 160 from damage.

As described elsewhere in this application, the communication tube 160 connects the inner chamber of the main valve cylinder 168 with the check valve 151 or alternately directly to the pilot valve 150 if a check valve 151 is not included with the sprinkler 100. Prior art communication tubes are typically composed of a flexible material which requires the tubes to be connected to barbed connectors. Such flexible communication tubes remained vulnerable to damage from handling and especially to tools used to move dirt, e.g. a shovel. In addition to the flexible tube, many additional parts, as well as labor, was required for proper installation of the communication tube.

The communication tube 160 simplifies the prior art tubes by eliminating the number of additional parts and assembly steps needed for installation, while providing additional integrity to the communication tube 160. The communication tube 160 is configured to connect the check valve 151 with the main valve cylinder 168 as a single angled component, closely following the sprinkler 100 body.

As seen in FIGS. 5-8, preferably, a rigid rib 200 fills the space between the communication tube 160 and the sprinkler 100 body. The rib 200 is molded to the shape of the communication tube 160, providing additional support and stability. Also, walls (not shown) may be included along the sides of the communication tube 160 for additional lateral support.

Optionally, the communication tube 160 may include a plastic thread, molded to the end of the communication tube 160. This plastic thread allows the communication tube to removably connect to the check valve 151 for repair or replacement. The check valve housing 154 incorporates an internal thread that mates with the threaded portion molded around the communication tube 160. This allows the check valve housing 154 to be connected to, and removed from, the communication tube 160 easily, thereby facilitating its repair and replacement.

Motor and Gear Train Housing

Referring now to FIGS. 7, 12A, 12B, 13, 14, 15 and 24A-24D a sealed motor housing 213 that also houses a motor 212 for use in the sprinkler 100 of the present invention is shown. Moreover, the motor 212 is shown coupled to a gear train 214. The sealed motor housing 213 is positioned above the screen 176, allowing water to flow through water tube 210, around the sealed motor housing 213 and out through the nozzle 101 when the sprinkler 100 is in operation. However, the sealed motor housing 213 prevents this water flow from leaking inside to the stepper motor 212 and gear train 214.

A top portion 214a of gear train 214 protrudes from a top aperture of sealed motor housing 213, interlocking with nozzle assembly 103 to rotate the nozzle 101 during sprinkler 100 operation. The top aperture of the sealed motor housing 213 is sealed with an O-ring 218 positioned between the top portion 214a of gear train 214 and the inner surface of the sealed motor housing 213.

Integral with the bottom of sealed motor housing 213 is a connector end plate 220 and connector receptacle 220a, having a cable port 238 which accepts a mating cable connector assembly 230, seen in FIGS. 15 and 24, at the end of electrical cable 216. This electrical cable 216 ultimately connects to an electronics module 244 (seen in FIG. 14) located in a body compartment 240 of the sprinkler 100, external to the water flow path. Since the cable connector assembly 230 provides a removable waterproof connection to the stepper motor 212, simple disconnection and removal of the motor housing 213 is facilitated.

Referring to FIGS. 15 and 24A-24D, the cable connector assembly 230 connects to the cable port 238 in the connector end plate 220 in a sealed, water-tight manner, being composed of a connector jack 232, overmolding 234, and a connector O-ring 236 or integrally molded sealing rings. Preferably, a telephone-style RJ-11 jack is used as the connector jack 232 in cable connector assembly 230, although a variety of different connector jacks 232 may be used.

The overmolding 234 is preferably composed of a resilient synthetic material (e.g. PVC or Santoprene) configured to enclose the connector jack 232 on all sides except at the end of the connector jack 232. The overmolding 234 has an O-ring 236 (or optionally multiple O-rings 236) composed of a compliant sealing material which may be used in conjunction with a waterproof gel (not shown) around the O-ring 236 and in the inner space 238 within the overmolding 234.

When the cable connector assembly 230 is connected to the cable port 238 on the connector plate 220, the O-ring 236 on the overmolding 234 presses against the connector plate 220, creating a water-tight seal preventing the inflow of water within the overmolding 234. The waterproof gel further enhances the seal created by the O-ring 236 and the connector plate 220, ensuring that no water comes in contact with the electrical pins 209 within the connector assembly 230.

Figure 24A:
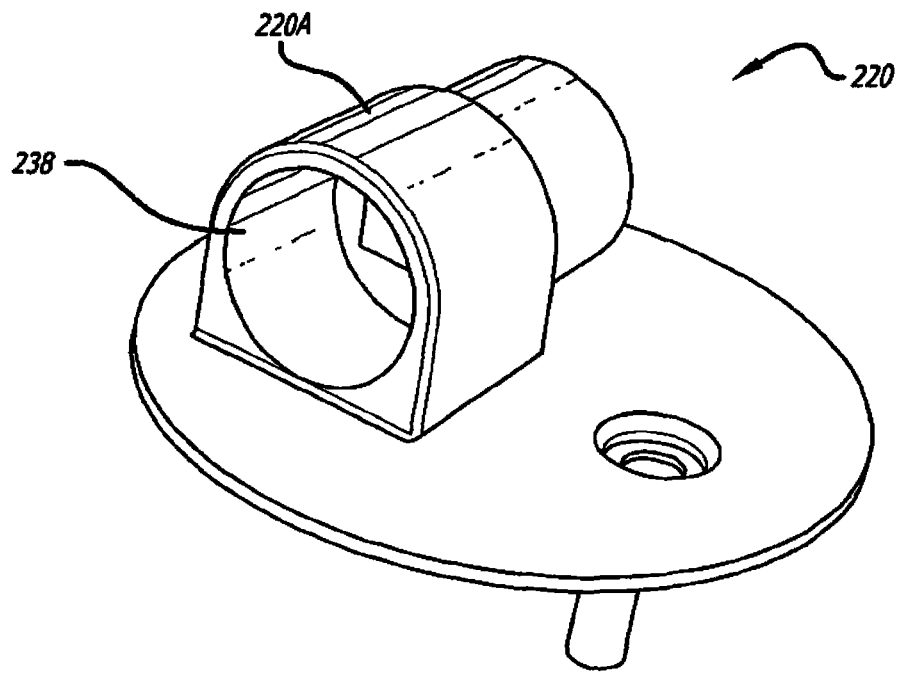
FIGS. 24A-24D illustrates a perspective view of an alternate preferred embodiment of a motor housing plate according to the present invention.
Figure 24B:
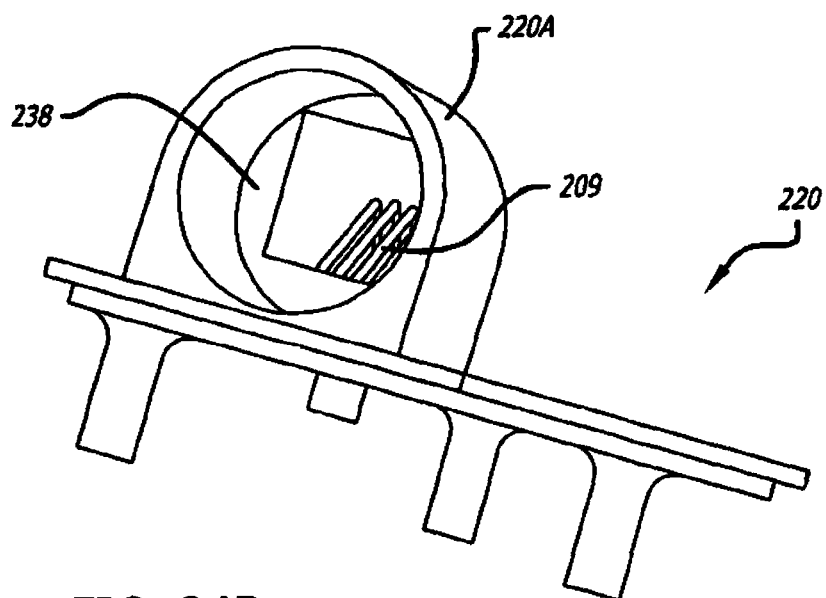
Figure 24C:
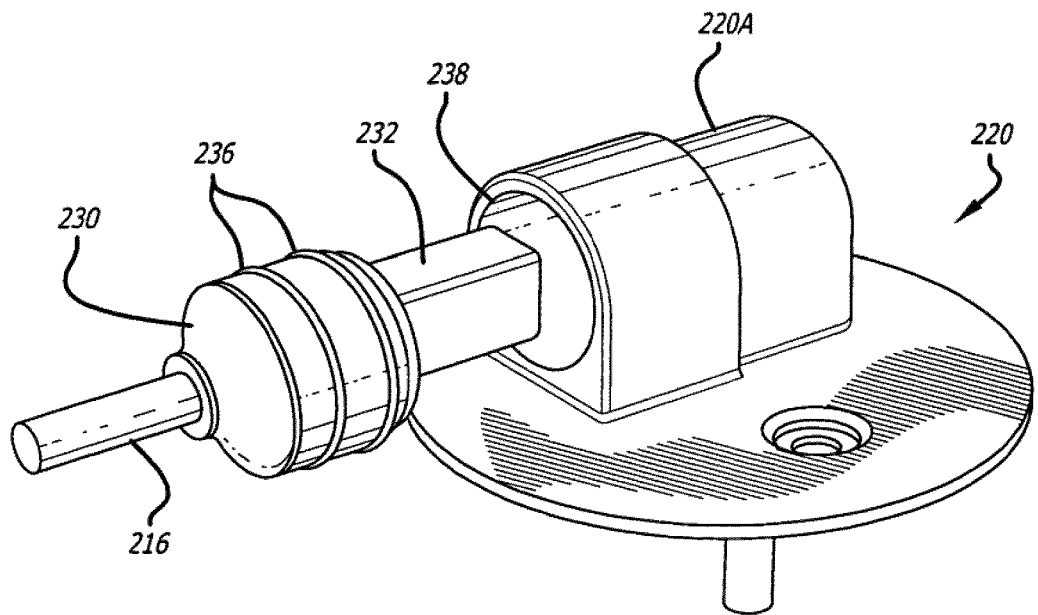
Figure 24D:
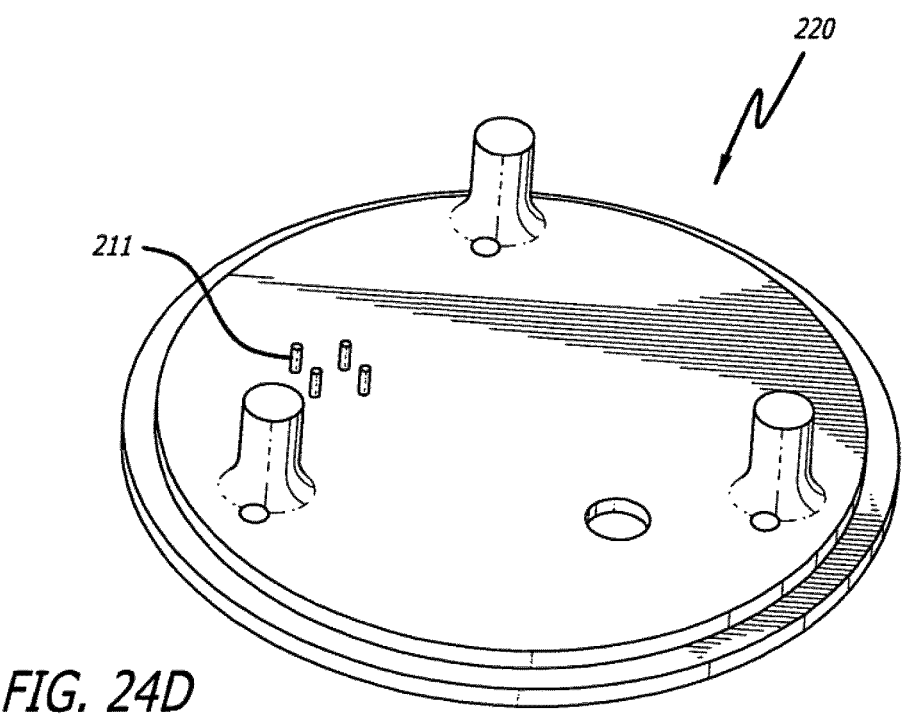

On the inner side of the connector plate 220, seen best in FIG. 24D, connecting pins 211 protrude from the connector plate 220, creating an electrical connection from the cable port 238 to the inside of the motor housing 213. A small cable, not shown, connects to these pins 211 to motor 212, providing power and communications data.

Alternatively, the O-ring 236 may be formed of an integral unitary portion of overmolding 234 and may also include multiple O-ring 234 shapes to enhance waterproofing of the cable connector assembly 230. In place of O-rings 234, more resilient "blade" shapes or "chevron seals" may also be used, molded in conjunction with the overmolding 234. Further, such O-rings 236 or blade shaped protrusions may be fixed or integral with the cable port of the connector end plate 220.

Figure 25A:
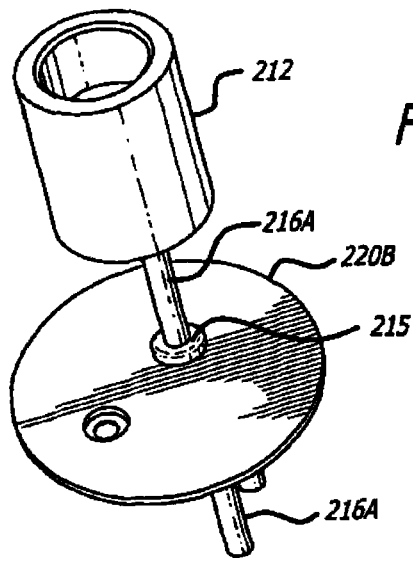
FIGS. 25A-25C illustrate a motor housing plate according to the present invention.
Figure 25B:
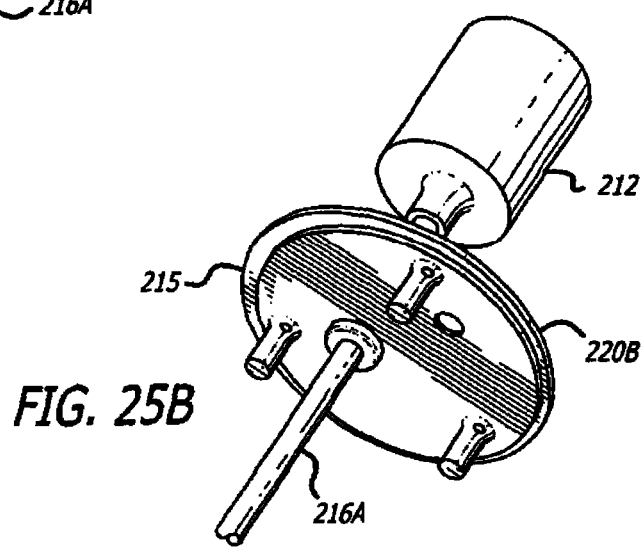
Figure 25C:
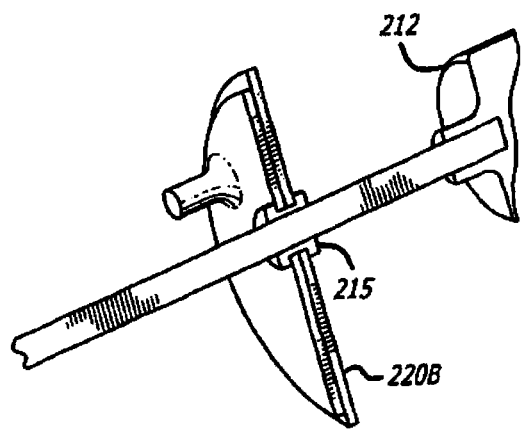

FIGS. 25A-25C illustrates another embodiment of the present invention, having an alternate connector plate 220b having an integral non-removable cable 216a, lacking a connector assembly. One end of the cable 216a is connected to the motor 212 on the inside of the motor housing 213, while the other end is connected to the electronics that drive the motor 212. The cable 216a is sealed to the end plate 220b by strain relief seal 215, such that water does not pass between the cable 216a and the seal 215. Preferably, the cable 216a is "integrally molded" into the end plate 220 via the seal 215, providing greater assurance that a leak path between the cable 216a and the end plate 220b is not present.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A sprinkler comprising:
   a sprinkler body having an outer wall;
   an inner wall forming a central compartment disposed within said sprinkler body;
   a riser having a nozzle connected to a water passage in selective communication with a water source; said riser being disposed within said central compartment, spaced from and movable relative to said central compartment;
   a plurality of body compartments surrounding a top region of said central compartment and formed from said outer wall, said inner wall, a bottom surface and a plurality of compartment sidewalls; and,
   a cover removably connected to form a top surface of said sprinkler and to cover a top opening of said plurality of body compartments.

2. The sprinkler of claim 1, wherein said cover encloses all of said plurality of body compartments.

3. The sprinkler of claim 2, wherein said cover further comprises an aperture through which a portion of said riser can pass through.

4. The sprinkler of claim 1, wherein at least one of said plurality of body compartments includes a pilot valve.

5. The sprinkler of claim 1, wherein said plurality of compartment side walls are removable.

6. The sprinkler of claim 1, wherein at least one of said plurality of body compartments includes a solenoid.

7. The sprinkler of claim 1, wherein said plurality of body compartments further comprise an integrally molded compartment.

8. The sprinkler of claim 1, wherein said outer wall has a top portion having a first diameter and a lower portion having a second diameter; and wherein said second diameter is smaller than said first diameter.

9. The sprinkler of claim 8, wherein said plurality of body compartments are located only within said top portion.

10. A sprinkler comprising:
    a sprinkler body having an outer wall;
    a riser disposed within said outer wall and having a nozzle to selectively rise out of said sprinkler body;
    a riser wall forming an outer circumference of said riser;
    a plurality of walls connected to said outer wall so as to form a plurality of body compartments surrounding a top end of said riser wall; said body compartments spaced apart from said riser wall; and,
    a cover removably connected to form a top surface of said sprinkler and to cover a top opening of said plurality of body compartments.

11. The sprinkler of claim 10, wherein said cover encloses all of said plurality of body compartments.

12. The sprinkler of claim 10, wherein said outer wall has a top portion having a first diameter and a lower portion having a second diameter; and wherein said second diameter is smaller than said first diameter.

13. The sprinkler of claim 12, wherein said plurality of body compartments are located only within said top portion.

14. The sprinkler of claim 10, wherein said plurality of walls are removable.

15. The sprinkler of claim 10, wherein at least one of said plurality of body compartments comprises a solenoid.

16. The sprinkler of claim 10, wherein said plurality of body compartments include at least two compartments of different sizes.

17. A sprinkler comprising:
a sprinkler body having an outer wall;
a riser disposed within said outer wall and having a nozzle coupled to a water passage to selectively rise out of said sprinkler body;
an inner wall located around and positioned away from a perimeter of said riser, forming a compartment space;
a plurality of walls connected to said outer wall and said inner wall so as to form a plurality of body compartments within said compartment space and having a top opening at a top of said sprinkler; and,
a cover removably connected to form a top surface of said sprinkler and to cover said plurality of body compartments.

18. The sprinkler of claim 17, wherein said cover encloses all of said plurality of body compartments.

19. The sprinkler of claim 18, wherein each of said plurality of compartments further comprise a plurality of removable inserts.

20. The sprinkler of claim 17, wherein at least one of said plurality of body compartments further comprises either a solenoid or a pilot valve.

21. The sprinkler of claim 17, wherein said plurality of body compartments have varying sizes.

22. The sprinkler of claim 17, wherein at least some of said plurality of body compartments each encompass different radial portions of said sprinkler body.

23. The sprinkler of claim 10, wherein at least some of said plurality of body compartments each encompass different radial portions of said sprinkler body.

* * * * *